US012747399B2

(12) United States Patent
Bao et al.

(10) Patent No.: US 12,747,399 B2
(45) Date of Patent: Sep. 29, 2026

(54) CATALYST COMPOSITIONS AND PROCESSES FOR MAKING AND USING SAME

(71) Applicant: ExxonMobil Chemical Patents Inc., Baytown, TX (US)

(72) Inventors: Xiaoying Bao, Houston, TX (US); Christian A. Diaz Urrutia, Auderghem (BE); Colin L. Beswick, Lebanon, NJ (US); Aaron R. Garg, San Francisco, CA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 132 days.

(21) Appl. No.: 18/840,668

(22) PCT Filed: Feb. 27, 2023

(86) PCT No.: PCT/US2023/063341

§ 371 (c)(1),
(2) Date: Aug. 22, 2024

(87) PCT Pub. No.: WO2023/183693

PCT Pub. Date: Sep. 28, 2023

(65) Prior Publication Data

US 2025/0179375 A1 Jun. 5, 2025

Related U.S. Application Data

(60) Provisional application No. 63/322,998, filed on Mar. 23, 2022, provisional application No. 63/322,450, filed on Mar. 22, 2022.

(51) Int. Cl.

| | |
|---|---|
| ***C10G 29/16*** | (2006.01) |
| ***B01J 23/02*** | (2006.01) |
| ***B01J 23/58*** | (2006.01) |
| ***B01J 23/96*** | (2006.01) |
| ***B01J 37/00*** | (2006.01) |
| ***B01J 37/02*** | (2006.01) |
| ***B01J 37/10*** | (2006.01) |
| ***B01J 38/12*** | (2006.01) |

(52) U.S. Cl.

CPC .............. *C10G 29/16* (2013.01); *B01J 23/02* (2013.01); *B01J 23/58* (2013.01); *B01J 23/96* (2013.01); *B01J 37/0045* (2013.01); *B01J 37/0201* (2013.01); *B01J 37/10* (2013.01); *B01J 38/12* (2013.01)

(58) Field of Classification Search

CPC . C10G 29/16; B01J 23/02; B01J 23/58; B01J 23/96; B01J 37/0045; B01J 37/0201; B01J 38/12

See application file for complete search history.

(56) References Cited

U.S. PATENT DOCUMENTS

| | | | | |
|---|---|---|---|---|
| 3,880,776 A * | 4/1975 | Box, Jr. | ................ C07C 5/3335 502/328 |
| 3,888,762 A | 6/1975 | Gerhold | |
| 4,866,019 A | 9/1989 | van Broekhoven | |
| 6,028,023 A | 2/2000 | Vierheiling | |
| 6,589,902 B1 | 7/2003 | Stamires | |
| 6,593,265 B2 | 7/2003 | Stamires | |
| 6,800,578 B2 | 10/2004 | Stamires | |
| 7,102,050 B1 | 9/2006 | Lattner | |
| 7,122,160 B2 | 10/2006 | Brookhart | |
| 7,195,741 B2 | 3/2007 | Lattner | |
| 7,361,264 B2 | 4/2008 | Vierheiling | |
| 7,417,005 B2 | 8/2008 | Vierheiling | |
| 7,740,829 B2 | 6/2010 | Becker | |
| 8,551,444 B2 | 10/2013 | Agnihotri | |
| 8,653,317 B2 | 2/2014 | Pierce | |
| 8,754,276 B2 | 6/2014 | Buchanan | |
| 9,687,803 B2 | 6/2017 | Alizadeh-Khiavi | |
| 10,160,708 B2 | 12/2018 | Lee | |
| 10,472,304 B2 | 11/2019 | Suriye | |
| 2002/0198428 A1 | 12/2002 | Iezzi et al. | |
| 2004/0008282 A1 | 1/2004 | Kawabata | |
| 2004/0029729 A1 | 2/2004 | Rytter | |
| 2005/0000396 A1 | 1/2005 | Dyson | |
| 2008/0194891 A1 | 8/2008 | Pretz | |
| 2011/0213042 A1 | 9/2011 | Labuschagne | |
| 2012/0067778 A1 | 3/2012 | Sánchez Valente et al. | |
| 2015/0065767 A1 | 3/2015 | Henao | |
| 2016/0082424 A1 | 3/2016 | Sanchez Valente | |
| 2016/0256840 A1 | 9/2016 | Pretz et al. | |
| 2017/0137285 A1 | 5/2017 | Ide | |
| 2022/0275289 A1 | 9/2022 | Bao et al. | |
| 2022/0281783 A1 | 9/2022 | Bao | |
| 2024/0269653 A1 | 8/2024 | Garg | |

FOREIGN PATENT DOCUMENTS

| | | | |
|---|---|---|---|
| EP | 3808451 A1 * | 4/2021 | .............. B01J 37/20 |
| EP | 3845514 A1 * | 7/2021 | .............. B01J 35/38 |

(Continued)

OTHER PUBLICATIONS

Yanchang Wang, et al., “Preparation of Layered Double Hydroxide Microspheres by Spray Drying”, Industrial & Engineering Chemistry Research, (Aug. 6, 2008), pp. 5746-5750, vol. 47.

(Continued)

*Primary Examiner* — Kyle Armstrong

(74) *Attorney, Agent, or Firm* — WOMBLE BOND DICKINSON (US) LLP; Kevin Davis

(57) ABSTRACT

Catalyst compositions and processes for making and using same. The catalyst composition can include 0.001 wt % to 6 wt % of a Group 8-10 element disposed on a support, based on the weight of the support. The support can include Al and at least 0.5 wt % of a Group 2 element, based on the weight of the support. The catalyst composition can be free of Si or can contain <0.5 wt % of Si, based on the weight of the support.

25 Claims, 4 Drawing Sheets

(56) References Cited

FOREIGN PATENT DOCUMENTS

| | | | |
|---|---|---|---|
| GB | 1107432 | A | 3/1968 |
| JP | 51-005356 | B | 2/1976 |
| JP | 60-060424 | A | 4/1985 |
| TW | 201410322 | | 3/2014 |
| WO | 2008/083563 | | 7/2008 |
| WO | 2013/169461 | | 11/2013 |
| WO | 2017/078894 | | 5/2017 |
| WO | 2020/263599 | A1 | 12/2020 |
| WO | 2021/225747 | | 11/2021 |
| WO | 2022/031423 | | 2/2022 |
| WO | 2023/009259 | A1 | 2/2023 |

OTHER PUBLICATIONS

Natalia Chubar, et al., “Applications versus properties of Mg—Al layered double hydroxides provided by their syntheses methods: Alkoxide and alkoxide-free sol-gel syntheses and hydrothermal precipitation”, Chemical Engineering Journal, (2013), pp. 284-299, vol. 234.

Jaime S. Valente, et al., “Novel SOx removal catalysts for the FCC process: Manufacture method, characterization, and pilot-scale testing”, Energy & Environmental Science, (2011), pp. 4096-4107, vol. 4.

Wittaya Julklang, et al., “Fabrication of layered double hydroxide microspheres by spray drying of nanoparticles: Effects of process conditions”, Science Direct, (2017), pp. 429-432, vol. 209.

* cited by examiner

CATALYST COMPOSITIONS AND PROCESSES FOR MAKING AND USING SAME

CROSS-REFERENCE TO RELATED APPLICATIONS

This application is a US national phase application of PCT Application Serial No. PCT/US2023/063341 having a filing date Feb. 27, 2023, which claims priority to and the benefit of U.S. Provisional Application No. 63/322,450 having a filing date of Mar. 22, 2022, and U.S. Provisional Application No. 63/322,998 having a filing date of Mar. 23, 2022, the disclosures of all of which are incorporated herein by reference in their entireties.

FIELD

This disclosure relates to catalyst compositions and processes for making and using same.

BACKGROUND

Catalytic reforming or dehydrogenation, dehydroaromatization, and/or dehydrocyclization of alkane and/or alkyl aromatic hydrocarbons are industrially important chemical conversion processes that are endothermic and equilibrium-limited. The reforming or dehydrogenation, dehydroaromatization, and/or dehydrocyclization of alkanes, e.g., $C_1$-$C_{12}$ alkanes, and/or alkyl aromatics, e.g., ethylbenzene, can be done through a variety of different catalyst compositions such as the Pt-based, Ni-based, Pd-based, Ru-based, Re-based, Cr-based, Ga-based, V-based, Zr-based, In-based, W-based, Mo-based, Zn-based, and Fe-based systems disposed on a support.

Among the existing propane dehydrogenation processes, a certain process uses an alumina supported chromia catalyst that provides one of the highest propylene yields of approximately 50% (55% propane conversion at 90% propylene selectivity), which is obtained at a temperature of approximately 560° C. to 650° C. and at a low pressure of 20 kPa-absolute to 50 kPa-absolute. It is desirable to increase the propylene yield without having to operate at such low pressure to increase the efficiency of the dehydrogenation process.

There is a need, therefore, for improved catalyst compositions and processes for making and using same. This disclosure satisfies this and other needs.

SUMMARY

Catalyst compositions and processes for making and using same are provided. In some embodiments, the catalyst composition can include 0.001 wt % to 6 wt % of a Group 8-10 element disposed on a support, based on the weight of the support. The support can include Al and at least 0.5 wt % of a Group 2 element, based on the weight of the support. The catalyst composition can be free of Si or can contain <0.5 wt %, <0.45wt %, <0.4 wt %, <0.35 wt %, <0.3 wt %, <0.25 wt %, <0.2 wt %, <0.15 wt %, <0.1 wt %, <0.05 wt %, or <0.01 wt % of Si, based on the weight of the support.

In some embodiments, the process for making a catalyst composition can include (I) preparing a slurry or a gel that include Al or a compound thereof, a Group 2 element or a compound thereof, and a liquid medium; (II) spray drying the slurry or the gel to produce spray dried particles that include the Al or the compound thereof and the Group 2 element or the compound thereof; and (III) calcining the spray dried particles under an oxidative atmosphere to produce calcined support particles that can include the Al or the compound thereof and the Group 2 element or the compound thereof. The process can also include at least one (1), (ii), and (iii): (i) a Group 8-10 element can be present in the slurry or the gel in the form of a Group 8-10 element-containing compound and the catalyst composition can include catalyst particles that include the calcined support particles having the Group 8-10 element disposed thereon, (ii) a Group 8-10 element can be deposited on the spray dried particles by contacting the spray dried particles with a Group 8-10 element-containing compound to produce Group 8-10 element-containing spray dried particles and the catalyst composition includes catalyst particles that include the calcined support particles having the Group 8-10 element disposed thereon, and (iii) a Group 8-10 element can be deposited on the calcined support particles by contacting the calcined support particles with a Group 8-10 element-containing compound to produce Group 8-10 element-containing calcined support particles and the process further includes (IV) calcining the Group 8-10 element-containing calcined support particles to produce re-calcined support particles having the Group 8-10 element disposed thereon, where the catalyst composition includes the re-calcined support particles. The catalyst particles can include the Group 8-10 element in an amount of 0.001 wt % to 6 wt %, the at least 0.5 wt % of the Group 2 element, and the catalyst composition can be free of Si or can contain <0.5 wt %, <0.45 wt %, <0.4 wt %, <0.35 wt %, <0.3 wt %, <0.25 wt %, <0.2 wt %, <0.15 wt %, <0.1 wt %, <0.05 wt %, or <0.01 wt % of Si, where all weight percent values are based on the weight of the calcined support particles or the re-calcined support particles.

In some embodiments, a process for upgrading a hydrocarbon-containing feed can include (I) contacting a hydrocarbon-containing feed with a catalyst composition that can include a Group 8-10 element disposed on a support to effect one or more of dehydrogenation, dehydroaromatization, and dehydrocyclization of at least a portion of the hydrocarbon-containing feed to produce a coked catalyst composition and an effluent comprising one or more upgraded hydrocarbons and molecular hydrogen. The hydrocarbon-containing feed can include one or more of $C_2$-$C_{16}$ linear or branched alkanes, or one or more of $C_4$-$C_{16}$ cyclic alkanes, or one or more $C_8$-$C_{16}$ alkyl aromatics, or a mixture thereof. The hydrocarbon-containing feed and catalyst composition can be contacted at a temperature in a range of from 300° C. to 900° C., for a time period of ≤3 hours, under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatics in the hydrocarbon-containing feed. The support can include Al and at least 0.5 wt % of a Group 2 element based on the weight of the support. The catalyst composition can include the Group 8-10 element in an amount of 0.001 wt % to 6 wt % based on the weight of the support. The catalyst composition can be free of Si or can contain <0.5 wt %, <0.45 wt %, <0.4 wt %, <0.35 wt %, <0.3 wt %, <0.25 wt %, <0.2 wt %, <0.15 wt %, <0.1 wt %, <0.05 wt %, or <0.01 wt % of Si based on the weight of the support. The one or more upgraded hydrocarbons can include at least one of a dehydrogenated hydrocarbon, a dehydroaromatized hydrocarbon, and a dehydrocyclized hydrocarbon.

DETAILED DESCRIPTION

Figure 1:
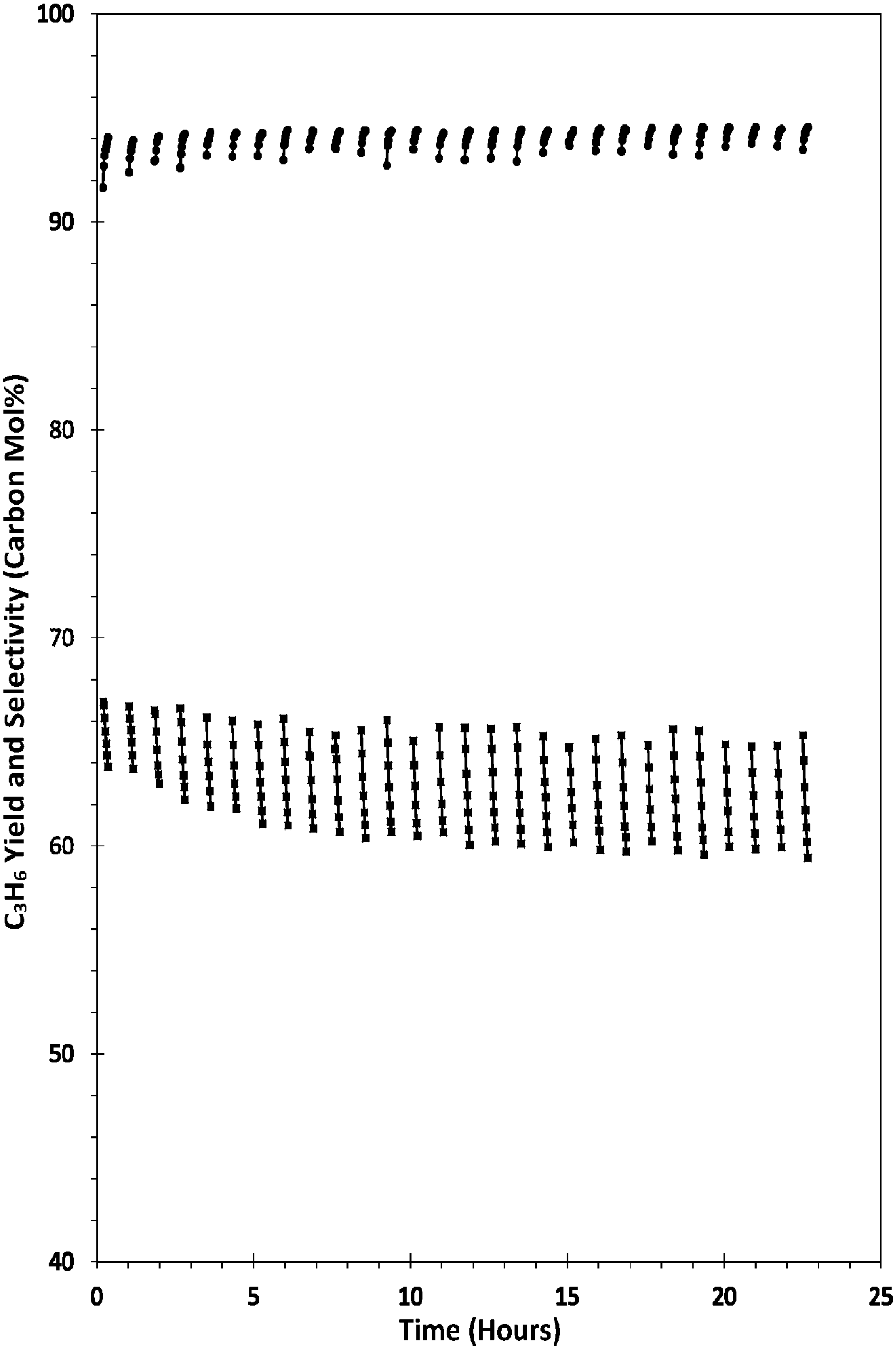
FIG. 1 shows the $C_3H_6$ yield and selectivity of a catalyst composition (Catalyst 1) that included Al in the support and was free of Si maintained its performance over a number of cycles.

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention may be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

In this disclosure, a process is described as comprising at least one "step." It should be understood that each step is an action or operation that may be carried out once or multiple times in the process, in a continuous or discontinuous fashion. Unless specified to the contrary or the context clearly indicates otherwise, multiple steps in a process may be conducted sequentially in the order as they are listed, with or without overlapping with one or more other steps, or in any other order, as the case may be. In addition, one or more or even all steps may be conducted simultaneously with regard to the same or different batch of material. For example, in a continuous process, while a first step in a process is being conducted with respect to a raw material just fed into the beginning of the process, a second step may be carried out simultaneously with respect to an intermediate material resulting from treating the raw materials fed into the process at an earlier time in the first step. Preferably, the steps are conducted in the order described.

Unless otherwise indicated, all numbers indicating quantities in this disclosure are to be understood as being modified by the term "about" in all instances. It should also be understood that the precise numerical values used in the specification and claims constitute specific embodiments. Efforts have been made to ensure the accuracy of the data in the examples. However, it should be understood that any measured data inherently contains a certain level of error due to the limitation of the technique and/or equipment used for acquiring the measurement.

Certain embodiments and features are described herein using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated.

The indefinite article "a" or "an", as used herein, means "at least one" unless specified to the contrary or the context clearly indicates otherwise. Thus, embodiments using "a reactor" or "a conversion zone" include embodiments where one, two or more reactors or conversion zones are used, unless specified to the contrary or the context clearly indicates that only one reactor or conversion zone is used.

The term "hydrocarbon" means (i) any compound consisting of hydrogen and carbon atoms or (ii) any mixture of two or more such compounds in (i). The term "Cn hydrocarbon," where n is a positive integer, means (i) any hydrocarbon compound comprising carbon atom(s) in its molecule at the total number of n, or (ii) any mixture of two or more such hydrocarbon compounds in (i). Thus, a $C_2$ hydrocarbon can be ethane, ethylene, acetylene, or mixtures of at least two of these compounds at any proportion. A "Cm to Cn hydrocarbon" or "Cm-Cn hydrocarbon," where m and n are positive integers and m<n, means any of Cm, Cm+1, Cm+2, . . . , Cn−1, Cn hydrocarbons, or any mixtures of two or more thereof. Thus, a "C2 to C3 hydrocarbon" or "C2-C3 hydrocarbon" can be any of ethane, ethylene, acetylene, propane, propene, propyne, propadiene, cyclopropane, and any mixtures of two or more thereof at any proportion between and among the components. A "saturated C2-C3 hydrocarbon" can be ethane, propane, cyclopropane, or any mixture thereof of two or more thereof at any proportion. A "Cn+ hydrocarbon" means (i) any hydrocarbon compound comprising carbon atom(s) in its molecule at the total number of at least n, or (ii) any mixture of two or more such hydrocarbon compounds in (i). A "Cn-hydrocarbon" means (i) any hydrocarbon compound comprising carbon atoms in its molecule at the total number of at most n, or (ii) any mixture of two or more such hydrocarbon compounds in (i). A "Cm hydrocarbon stream" means a hydrocarbon stream consisting essentially of Cm hydrocarbon(s). A "Cm-Cn hydrocarbon stream" means a hydrocarbon stream consisting essentially of Cm-Cn hydrocarbon(s).

For the purposes of this disclosure, the nomenclature of elements is pursuant to the version of the Periodic Table of Elements (under the new notation) as provided in Hawley's Condensed Chemical Dictionary, $16^{th}$ Ed., John Wiley & Sons, Inc., (2016), Appendix V. For example, a Group 2 element includes Mg, a Group 8 element includes Fe, a Group 9 element includes Co, a Group 10 element includes Ni, and a Group 13 element includes Al. The term "metalloid", as used herein, refers to the following elements: B, Si, Ge, As, Sb, Te, and At. In this disclosure, when a given element is indicated as present, it can be present in the elemental state or as any chemical compound thereof, unless it is specified otherwise or clearly indicated otherwise by the context.

The term "alkane" means a saturated hydrocarbon. The term "cyclic alkane" means a saturated hydrocarbon comprising a cyclic carbon ring in the molecular structure thereof. An alkane can be linear, branched, or cyclic.

The term "aromatic" is to be understood in accordance with its art-recognized scope, which includes alkyl substituted and unsubstituted mono- and polynuclear compounds.

The term "rich" when used in phrases such as "X-rich" or "rich in X" means, with respect to an outgoing stream obtained from a device, e.g., a conversion zone, that the stream comprises material X at a concentration higher than in the feed material fed to the same device from which the stream is derived. The term "lean" when used in phrases such as "X-lean" or "lean in X" means, with respect to an outgoing stream obtained from a device, e.g., a conversion zone, that the stream comprises material X at a concentration lower than in the feed material fed to the same device from which the stream is derived.

The term "mixed metal oxide" refers to a composition that includes oxygen atoms and at least two different metal atoms that are mixed on an atomic scale. For example, a "mixed Mg/Al metal oxide" has O, Mg, and Al atoms mixed on an atomic scale and is substantially the same as or identical to a composition obtained by calcining an Mg/Al hydrotalcite that bas the general chemical formula $$\left[Mg_{(1-x)}Al_x(OH)_2\right]\left(A^{n-}_{\frac{x}{n}}\right)\cdot mH_2O\right],$$

where A is a counter anion of a negative charge n, x is in a range of from >0 to <1, and m is ≥0. A material consisting of nm sized MgO particles and nm sized $Al_2O_3$ particles mixed together is not a mixed metal oxide because the Mg and Al atoms are not mixed on an atomic scale but are instead mixed on a nm scale.

The term "selectivity" refers to the production (on a carbon mole basis) of a specified compound in a catalytic reaction. As an example, the phrase "an alkane hydrocarbon conversion reaction has a 100% selectivity for an olefin hydrocarbon" means that 100% of the alkane hydrocarbon (carbon mole basis) that is converted in the reaction is converted to the olefin hydrocarbon. When used in connection with a specified reactant, the term "conversion" means the amount of the reactant consumed in the reaction. For example, when the specified reactant is propane, 100% conversion means 100% of the propane is consumed in the reaction. In another example, when the specified reactant is propane, if one mole of propane converts to one mole of methane and one mole of ethylene, the selectivity to methane is 33.3% and the selectivity to ethylene is 66.7%. Yield (carbon mole basis) is conversion times selectivity.

In this disclosure, "A, B, . . . or a combination thereof" means "A, B, . . . or any combination of any two or more of A, B . . . ". "A, B . . . , or a mixture thereof" means "A, B . . . , or any mixture of any two or more of A, B, . . . ".

Catalyst Composition

The catalyst composition can include 0.001 wt %, 0.002 wt %, 0.003 wt %, 0.004 wt %, 0.005 wt %, 0.006 wt %, 0.007 wt %, 0.008 wt %, 0.009 wt %, 0.01 wt %, 0.015 wt %, 0.02 wt %, 0.025 wt %, 0.03 wt %, 0.035 wt %, 0.04 wt %, 0.045 wt %, 0.05 wt %, 0.055 wt %, 0.06 wt %, 0.065 wt %, 0.07 wt %, 0.08 wt %, 0.085 wt %, 0.09 wt %, 0.095 wt %, 0.1 wt %, 0.2 wt %, 0.3 wt %, 0.4 wt %, 0.5 wt %, 0.6 wt %, 0.7 wt %, 0.8 wt %, 0.9 wt %, or 1 wt % to 2 wt %, 3 wt %, 4 wt %, 5 wt %, or 6 wt % of a Group 8-10 element disposed on a support, based on the weight of the support. In some embodiments, the catalyst composition can include ≤5.5 wt %, ≤4.5 wt %, ≤3.5 wt %, ≤2.5 wt %, ≤1.5 wt %, ≤1 wt %, ≤0.9 wt %, ≤0.8 wt %, ≤0.7 wt %, ≤0.6 wt %, ≤0.5 wt %, ≤0.4 wt %, ≤0.3 wt %, ≤0.2 wt %, ≤0.15 wt %, ≤0.1 wt %, ≤0.09 wt %, ≤0.08 wt %, ≤0.07 wt %, ≤0.06 wt %, ≤0.05 wt %, ≤0.04 wt %, ≤0.03 wt %, ≤0.02 wt %, ≤0.01 wt %, ≤0.009 wt %, ≤0.008 wt %, ≤0.007 wt %, ≤0.006 wt %, ≤0.005 wt %, ≤0,004 wt %, ≤0.003 wt %, or ≤0,002 wt % of the Group 8-10 element disposed on the support, based on the weight of the support.

In some embodiments, the Group 8-10 element can be or can include, but is not limited to, Fe, Co, Ni, Ru, Pd, Os, Ir, Pt, a combination thereof, or a mixture thereof. In at least one embodiment, the Group 8-10 element can be or can include Pt. If two or more Group 8-10 elements are disposed on the support, the catalyst composition can include 0.001 wt %, 0.002 wt %, 0.003 wt %, 0.004 wt %, 0.005 wt %, 0.006 wt %, 0.007 wt %, 0.008 wt %, 0.009 wt %, 0.01 wt %, 0.015 wt %, 0.02 wt %, 0.025 wt %, 0.03 wt %, 0.035 wt %, 0.04 wt %, 0.045 wt %, 0.05 wt %, 0.055 wt %, 0.06 wt %, 0.065 wt %, 0.07 wt %, 0.08 wt %, 0.085 wt %, 0.09 wt %, 0.095 wt %, 0.1 wt %, 0.2 wt %, 0.3 wt %, 0.4 wt %, 0.5 wt %, 0.6 wt %, 0.7 wt %, 0.8 wt %, 0.9 wt %, or 1 wt % to 2 wt %, 3 wt %, 4 wt %, 5 wt %, or 6 wt % of a combined amount of the two or more Group 8-10 elements disposed on the support, based on the weight of the support. In some embodiments, an active component of the catalyst composition that can be capable of effecting one or more of reforming or dehydrogenation, dehydroaromatization, and dehydrocyclization of a hydrocarbon-containing feed can be or can include the Group 8-10 element(s) disposed on the support.

The support can be or can include, but is not limited to, one or more Group 2 elements and aluminum (Al). The Group 2 element can be or can include, Be, Mg, Ca, Sr, Ba, or combination thereof, or a mixture thereof. In some embodiments, the Group 2 element and/or the Al can be present in its elemental form. In other embodiments, the Group 2 element and/or the Al can be present in the form of a compound. For example, the Group 2 element and/or the Al can be present as an oxide, a phosphate, a halide, a halate, a sulfate, a sulfide, a borate, a nitride, a carbide, an aluminate, a carbonate, metaphosphate, a selenide, a tungstate, a molybdate, a chromite, a chromate, or a dichromate. In some embodiments, a mixture of any two or more compounds that include the Group 2 element and/or the Al can be present in different forms.

It has been surprisingly and unexpectedly discovered that when the support includes the Group 2 element and Al, the presence of silicon (Si) is detrimental to the longevity of the catalyst composition. More particularly, the catalyst composition that includes the Group 2 element, Al, and ≥0.5 wt % of Si based on the weight of the support, the catalyst composition will rapidly deactivate as the number of cycles increases. Each cycle includes, at a minimum, contacting a hydrocarbon-containing feed with the catalyst composition to produce a coked catalyst composition and an effluent that can include one or more upgraded hydrocarbons and molecular hydrogen and contacting the catalyst composition with an oxidant to effect combustion of at least a portion of the coke to produce a regenerated catalyst lean in coke and a combustion gas. Contacting an additional quantity of the hydrocarbon-containing feed with the regenerated catalyst starts a second cycle. In some embodiments, the catalyst composition can be free of any Si. In other embodiments, the catalyst composition can include <0.5 wt %, <0.45 wt %, <0.4 wt %, <0.35 wt %, <0.3 wt %, <0.25 wt %, <0.2 wt %, <0.15 wt %, <0.1 wt %, <0.09 wt %, <0.08 wt %, <0.07 wt %, <0.06 wt %, <0.05 wt %, <0.04 wt %, <0.03 wt %, 0.02 wt %, <0.01 wt %, <0.007 wt %, <0.005 wt %, <0.003 wt %, <0.001 wt %, <0.0007 wt %, <0.0005 wt %, <0.0003 wt %, or <0.0001 wt % of Si, based on the weight of the support.

In some embodiments, the Group 2 element and the Al can be in the form of a mixed Group 2 element/Al metal oxide that has O, Mg, and Al atoms mixed on an atomic scale. In some embodiments the support can be or can include the Group 2 element and the Al in the form of an oxide or one or more oxides of the Group 2 element and $Al_2O_3$ that can be mixed on a nm scale. In some embodiments, the support can be or can include an oxide of the Group 2 element, e.g., MgO, and $Al_2O_3$ mixed on a nm scale.

In some embodiments, the support can be or can include a first quantity of the Group 2 element and the Al in the form of a mixed Group 2 element/Al metal oxide and a second quantity of the Group 2 element in the form of an oxide of the Group 2 element. In such embodiment, the mixed Group 2 element/Al metal oxide and the oxide of the Group 2 element can be mixed on the nm scale and the Group 2 element and Al in the mixed Group 2 element/Al metal oxide can be mixed on the atomic scale.

In other embodiments, the support can be or can include a first quantity of the Group 2 element and a first quantity of the Al in the form of a mixed Group 2 element/Al metal oxide, a second quantity of the Group 2 element in the form of an oxide of the Group 2 element, and a second quantity of the Al in the form of $Al_2O_3$. In such embodiment, the mixed Group 2 element/Al metal oxide, the oxide of the Group 2 element, and the $Al_2O_3$ can be mixed on a nm scale and the Group 2 element and Al in the mixed Group 2 element/Al metal oxide can be mixed on the atomic scale.

In some embodiments, the support can be or can include, but is not limited to, one or more of the following compounds: $Mg_wAl_2O_{3+w}$, where w is a positive number; $Ca_xAl_2O_{3+x}$, where x is a positive number; $Sr_yAl_2O_{3+y}$, where y is a positive number; $Ba_zAl_2O_{3+z}$, where z is a positive number. BeO, MgO, CaO, BaO, SrO, $BeCO_3$, $MgCO_3$, $CaCO_3$, $SrCO_3$, $BaCO_3$, $CaZrO_3$, $Ca_7ZrAl_6O_{18}$, $CaTiO_3$, $Ca_7Al_6O_{18}$, $Ca_7HfAl_6O_{18}$, $BaCeO_3$, one or more magnesium chromates, one or more magnesium tungstates, one or more magnesium molybdates, combinations thereof, and/or mixtures thereof.

In some embodiments, the $Mg_wAl_2O_{3+w}$, where w is a positive number, if present as the support or as a component of the support can have a molar ratio of Mg to Al in a range from 0.5, 1, 2, 3, 4, or 5 to 6, 7, 8, 9, or 10. In some embodiments, the $Mg_wAl_2O_{3+w}$ can include $MgAl_2O_4$, $Mg_2Al_2O_5$, or a mixture thereof. The $Ca_xAl_2O_{3+x}$, where x is a positive number, if present as the support or as a component of the support can have a molar ratio of Ca to Al in a range from 1:12, 1:4, 1:2, 2:3, 5:6, 1:1, 12:14, or 1,5:1, In some embodiments, the $Ca_xAl_2O_{3+x}$ can include tricalcium aluminate, dodecacalcium hepta-aluminate, monocalcium aluminate, monocalcium dialuminate, monocalcium hexa-aluminate, dicalcium aluminate, pentacalcium trialuminate, tetracalcium trialuminate, or any mixture thereof. The $Sr_yAl_2O_{3+y}$, where y is a positive number, if present as the support or as a component of the support can have a molar ratio of Sr to Al in a range from 0.05, 0.3, or 0.6 to 0.9, 1.5, or 3. The $Ba_zAl_2O_{3+z}$, where z is a positive number, if present as the support or as a component of the support can have a molar ratio of Ba to Al 0.05, 0.3, or 0.6 to 0.9, 1.5, or 3.

In some embodiments, a weight ratio of the Group 2 element to the Al in the support can be in a range from 0.001, 0.005, 0.01, 0.05, 0.1, 0.15, 0.2, 0.3, 0.5, 0.7, or 1 to 3, 6, 12.5, 25, 50, 75, 100, 200, 300, 400, 500, 600, 700, 800, 900, or 1,000. In some embodiments, the support can include ≥0.5 wt %, ≥1 wt %, ≥2 wt %, ≥2.1 wt %, ≥2.5 wt %, ≥3 wt %, ≥3.5 wt %, ≥4 wt %, ≥4.5 wt %, ≥5 wt %, ≥5.5 wt %, ≥6 wt %, ≥6.5 wt %, ≥7 wt %, ≥8 wt %, ≥9 wt %, ≥10 wt %, ≥11 wt %, ≥12 wt %, ≥13 wt %, ≥14 wt %, ≥15 wt %, ≥16 wt %, ≥17 wt %, ≥18 wt %, ≥19 wt %, ≥20 wt %, ≥21 wt %, ≥22 wt %, ≥23 wt %, ≥24 wt %, ≥25 wt %, ≥26 wt %, ≥27 wt %, ≥28 wt %, ≥29 wt %, ≥30 wt %, ≥35 wt %, ≥40 wt %, ≥45 wt %, ≥50 wt %, ≥55 wt %, ≥60 wt %, ≥65 wt %, ≥70 wt %, ≥75 wt %, ≥80 wt %, ≥85 wt %, or ≥90 wt % of the Group 2 element, based on the weight of the support. In some embodiments, the support can include the Group 2 element in a range from 0.5 wt %, 1 wt %, 1.5 wt %, 2 wt %, 2.1 wt %, 2.3 wt %, 2.5 wt %, 2.7 wt %, 3 wt %, 4 wt %, 5 wt %, 6 wt %, 7 wt %, 8 wt %, 9 wt %, 10 wt %, 11 wt %, 13 wt %, 15 wt %, 17 wt %, 19 wt %, 21 wt %, 23 wt %, or 25 wt % to 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 92.34 wt % based on the weight of the support. In some embodiments, the support can include Al in a range from 0.5 wt %, 1 wt %, 1.5 wt %, 2 wt %, 2.1 wt %, 2.3 wt %, 2.5 wt %, 2.7 wt %, 3 wt %, 4 wt %, 5 wt %, 6 wt %, 7 wt %, 8 wt %, 9 wt %, 10 wt %, or 11 wt % to 15 wt %, 20 wt %, 25 wt %, 30 wt %, 40 wt %, 45 wt %, or 50 wt %, based on the weight of the support. In some embodiments, a molar ratio of the Group 2 element to the one or more Group 8-10 elements, e.g., Pt, disposed on the support can be in a range from 0.24, 0.5, 1, 10, 50, 100, 300, 450, 600, 800, 1,000, 1,200, 1,500, 1,700, or 2,000 to 3,000, 3,500, 4,000, 4,500, 5,000, 5,500, 6,000, 6,500, 7,000, 7,500, 8,000, 8,500, 9,000, 9,500, 10,000, 15,000, 20,000, 25,000, 30,000, 35,000, 40,000, 45,000, 50,000, 55,000, 60,000, 65,000, 70,000, 75,000, 80,000, 85,000, 90,000, 95,000, 100,000, 200,000, 300,000, 400,000, 500,000, 600,000, 700,000, 800,000, or 900,000.

In some embodiments, the catalyst composition can optionally include a promoter in an amount of up to 10 wt % disposed on the support, based on the weight of the support. In some embodiments, the catalyst composition can include 0.01 wt %, 0.1 wt %, 0.2 wt %, 0.25 wt %, 0.3 wt %, 0.4 wt %, 0.5 wt %, 0.6 wt %, 0.7 wt %, 0.8 wt %, 0.9 wt %, or 1 wt % to 2 wt %, 3 wt %, 4 wt %, 5 wt %, 6 wt %, 7 wt %, 8 wt %, 9 wt %, or 10 wt % of the promoter disposed on the support, based on the weight of the support. The promoter can be or can include, but is not limited to, Sn, Cu, Au, Ag, Ga, Zn, Ge, In, Re, Ag, a combination thereof, or a mixture thereof. In some embodiments, the promoter can be associated with the Group 8-10 element. For example, the promoter and the Group 8-10 element, e.g., Pt, disposed on the support can form Group 8-10 element-promoter clusters that can be dispersed on the support. The promoter can improve the selectivity/activity/longevity of the catalyst composition for a given upgraded hydrocarbon. In some embodiments, the promoter can improve the propylene selectivity of the catalyst composition when the hydrocarbon-containing feed includes propane.

In some embodiments, the catalyst composition can optionally include one or more alkali metal elements in an amount of up to 5 wt % disposed on the support, based on the weight of the support. In some embodiments the catalyst composition can include 0.01 wt %, 0.1 wt %, 0.2 wt %, 0.3 wt %, 0.4 wt %, 0.5 wt %, 0.6 wt %, 0.7 wt %, 0.8 wt %, 0.9 wt %, or 1 wt % to 2 wt %, 3 wt %, 4 wt %, or 5 wt % of the alkali metal element disposed on the support, based on the weight of the support. The alkali metal element, if present, can be or can include, but is not limited to, Li, Na, K, Rb, Cs, or a combination thereof, or a mixture thereof. In at least some embodiments, the alkali metal element ca be or can include K and/or Cs. In some embodiments, the alkali metal element, if present, can improve the selectivity of the catalyst composition for a given upgraded hydrocarbon.

In some embodiments, the support can also include, but is not limited to, at least one metal element and/or at least one metalloid element selected from Groups other than Groups 2 and 8-10 and/or at least one compound thereof, where the at least one metal element and/or at least one metalloid element is not one of the alkali metal elements or one of the promoter elements. If the support also includes a compound that includes the metal element and/or metalloid element selected from Groups other than Groups 2 and 8-10, where the at least one metal element and/or at least one metalloid element is not one of the alkali metal elements or one of the promoter elements, the compound can be present in the support as an oxide, a phosphate, a halide, a halate, a sulfate, a sulfide, a borate, a nitride, a carbide, an aluminate, a carbonate, metaphosphate, a selenide, a tungstate, a molybdate, a chromite, a chromate, or a dichromate. In some embodiments, the at least one metal element and/or at least one metalloid element selected from Groups other than Groups 2 and 8-10 and/or at least one compound thereof, where the at least one metal element and/or at least one metalloid element is not one of the alkali metal elements or one of the promoter elements, can be or can include, but is not limited to, one or more rare earth elements, i.e., elements having an atomic number of 21, 39, or 57 to 71.

If the support includes the at least one metal element and/or at least one metalloid element selected from Groups other than Groups 2 and 8-10 and/or at least one compound thereof, where the at least one metal element and/or at least one metalloid element is not one of the alkali metal elements or one of the promoter elements, the at least one metal element and/or at least one metalloid element can, in some embodiments, function as a binder and can be referred to as a "binder". Regardless of whether or not the at least one metal element and/or at least one metalloid element selected from Groups other than Groups 2 and 8-10 and/or at least one compound thereof, where the at least one metal element and/or at least one metalloid element is not one of the alkali metal elements or one of the promoter elements, the at least one metal element and/or at least one metalloid element selected from Groups other than Groups 2 and 8-10 will be further described herein as a "binder" for clarity and ease of description. In some embodiments, the support can include the binder in a range of from 0.01 wt %, 0.05 wt %, 0.1 wt %, 0.5 wt %, 1 wt %, 5 wt %, 10 wt %, 15 wt %, 20 wt %, 25 wt %, 30 wt %, 35 wt % or 40 wt % to 50 wt %, 60 wt %, 70 wt %, 80 wt %, or 90 wt % based on the weight of the support.

In some embodiments, suitable compounds that can be used as the binder can be or can include, but are not limited to, one or more of the following: $B_2O_3$, $AlBO_3$, $Al_2O_3$, $ZrO_2$, $TiO_2$, zinc aluminate, ZnO, VO, $V_2O_3$, $VO_2$, $V_2O_5$, $Ga_sO_t$, $In_uO_v$, $Mn_2O_3$, $Mn_3O_4$, MnO, one or more molybdenum oxides, one or more tungsten oxides, one or more zeolites, where s, t, u, and v are positive numbers and mixtures and combinations thereof. If the Group 2 element is in the form of a mixed metal oxide, e.g., a mixed Mg/Al metal oxide, the additional metal(s) in the mixed metal oxide is/are not considered to be part of a binder. For example, the support may include a mixed Mg/Al metal oxide, such as those obtained by calcining an Mg/Al hydrotalcite and such Al would not be considered as part of the binder, but the support could also include $Al_2O_3$; that is mixed on a nm scale with the mixed Mg/Al metal oxide and the $Al_2O_3$ would be considered as a binder.

In some embodiments, the catalyst composition can be in the form of catalyst particles or a monolithic structure. In some embodiments, if the catalyst composition is in the form of catalyst particles, the catalyst particles can have a median particle size in a range of from 1 μm, 5 μm, 10 μm, 20 μm, 40 μm, or 60 μm to 80 μm, 100 μm, 115 μm, 130 μm, 150 μm, 200 μm, 300 μm or 400, or 500 μm. In some embodiments, the catalyst particles can have an apparent loose bulk density in a range from 0.3 $g/cm^3$, 0.4 $g/cm^3$, 0.5 $g/cm^3$, 0.6 $g/cm^3$, 0.7 $g/cm^3$, 0.8 $g/cm^3$, 0.9 $g/cm^3$, or 1 $g/cm^3$ to 1.1 $g/cm^3$, 1.2 $g/cm^3$, 1.3 $g/cm^3$, 1.4 $g/cm^3$, 1.5 $g/cm^3$, 1.6 $g/cm^3$, 1.7 $g/cm^3$, 1.8 $g/cm^3$, 1.9 $g/cm^3$, or 2 $g/cm^3$, as measured according to ASTM D7481-18 modified with a 10, 25, or 50 mL graduated cylinder instead of a 100 or 250 mL graduated cylinder. In some embodiments, the catalyst particles can have an attrition loss after one hour of ≤5 wt %, ≤4 wt %, ≤3 wt %, ≤2 wt %. ≤1 w %, ≤0.7 wt %, ≤0.5 wt %, ≤0.4 wt %, ≤0.3 wt %, ≤0.2 wt %, ≤0.1 wt %, ≤0.07 wt %, or ≤0.05 wt %, as measured according to ASTM D5757-11 (2017). The morphology of the particles can be largely spherical so that they are suitable to run in a fluid bed reactor. In some embodiments, the catalyst particles can have a size and density that is consistent with a Geldart A or Geldart B definition of a fluidizable solid.

In some embodiments, the catalyst particles can have a surface area in a range from 0.1 $m^2/g$, 1 $m^2/g$, 10 $m^2/g$, or 100 $m^2/g$ to 500 $m^2/g$, 800 $m^2/g$, 1,000 $m^2/g$, or 1,500 $m^2/g$. The surface area of the catalyst particles can be measured according to the Brunauer-Emmett-Teller (BET) method using adsorption-desorption of nitrogen (temperature of liquid nitrogen, 77 K) with a Micromeritics 3flex instrument after degassing of the powders for 4 hrs at 350° C. More information regarding the method can be found, for example, in "Characterization of Porous Solids and Powders: Surface Area, Pore Size and Density," S. Lowell et al., Springer, 2004.

First Process for Making Catalyst Particles

The process for making the catalyst composition can include preparing a slurry or gel that can include, milling, mixing, blending, combining, or otherwise contacting, Al and/or a compound thereof, a Group 2 element and/or a compound thereof, and a liquid medium. In some embodiments, preparation of the slurry or gel can also include contacting, but is not limited to, the Al or a compound thereof, the Group 2 element or a compound thereof, and a liquid medium, and one or more additives. In other embodiments, preparing the slurry or gel can include contacting, but is not limited to, the Al or a compound thereof, the Group 2 element or a compound thereof, the liquid medium, a binder or binder precursor, and, optionally, one or more additives.

In some embodiments, the compound containing Al can be or can include, but is not limited to, $Al_2O_3$, $Al(OH)_2$, aluminum chlorohydrol (ACH), a layered double hydroxide that includes Al, Mg, or a mixture thereof. In some embodiments, the compound containing a Group 2 element can be in the form of an oxide, a hydroxide, a hydrated carbonate, a salt, a clay containing a Group 2 element, a layered double hydroxide, a phosphate, a halide, a halate, a sulfate, a sulfide, a borate, a nitride, a carbide, an aluminate, a carbonate, metaphosphate, a selenide, a tungstate, a molybdate, a chromite, a chromate, a dichromate, or a mixture thereof. In some embodiments, the Group 2 element can be or can include Mg and the compound containing the Group 2 element can be in the form of a magnesium oxide, a magnesium hydroxide, hydromagnesite (a bydrated magnesium carbonate mineral, $Mg_5(CO_3)_4(OH)_2.4H_2O$, a magnesium salt, a magnesium-containing clay, hydrotalcite (a layered double hydroxide that also includes Al), an organomagnesium compound or a mixture thereof. In some embodiments, the Group 2 element and the Al can be present as a mixed Group 2 element/Al metal oxide. In some embodiments, the Group 2 element and the Al can be present as a mixed Group 2 element/Al layered double hydroxide, e.g., hydrotalcite.

The liquid medium can be or can include, but is not limited to, water, alcohols, acetone, chloroform, methylene chloride, dimethyl formamide, dimethyl sulfoxide, glycerin, ethyl acetate, or any mixture thereof. Illustrative alcohols can be or can include, but are not limited to methanol, ethanol, isopropanol, or any mixture thereof. The binder, if present, can be or can include the binders described above. The binder precursor, if present, can be or can include, but is not limited to, aluminum chlorohydrol, boehmite, pseudo-boehmite, gibbsite, bayerite, aluminum nitrate, aluminum chloride, sodium aluminate, alumina sol, or any mixture thereof. It is known that in literature, some of the compounds herein referred to as "binders" may also be referred to as a filler, a matrix, an additive, etc. The one or more additives, if present, can be or can include, but is not limited to, one or more acids such as formic acid, lactic acid, citric acid, acetic acid, $HNO_3$, HCl, oxalic acid, stearic acid, carbonic acid, etc.; one or more bases such as an ammonia solution, NaOH, KOH, etc.; inorganic salts such as nitrates, carbonates, bicarbonates, chlorides, etc.; organic salts such as acetates, oxalates, formates, citrates, etc.; polymers such as polyvinyl alcohol, polysaccharide, etc., or any mixture thereof. The additives can help to improve the chemical/physical property of the spray dried material and/or to improve the rheological property of the slurry/gel to facilitate spray drying.

The slurry or gel can be spray dried to produce spray dried particles that include the Group 2 element and Al. Spray drying refers to the process of producing a dry particulate solid product from the slurry or the gel. The process can include spraying or atomizing the slurry or gel, e.g., forming small droplets, into a temperature-controlled gas stream to evaporate the liquid medium from the atomized droplets and produce the particulate solid product. For example, in the spray drying process, the slurry or gel can be atomized to small droplets and mixed with hot air or a hot inert gas, e.g., nitrogen, to evaporate the liquid from the droplets. The temperature of the slurry or gel during the spray drying process can usually be close to or greater than the boiling temperature of the liquid. An outlet air temperature of about 60° C. to about 120° C. can be common.

The slurry or gel can be atomized with one or more pressure nozzles (e.g., a fluid nozzle atomizer), one or more pulse atomizers, one or more high speed spinning discs (e.g., centrifugal or rotary atomizer), or any other known process. The median particle size, liquid (e.g., water) concentration, apparent loose bulk density, or any combination thereof, of the particulate solid product prepared via spray drying can be controlled, adjusted, or otherwise influenced by one or more operating conditions and/or parameters of the spray dryer. Illustrative operating conditions can include, but are not limited to, the feed rate and temperature of the gas stream, the atomizer velocity, the feed rate of the slurry or gel via the atomizer, the temperature of the slurry or gel, the size and/or solids concentration of the droplets, the spray dryer dimensions, or any combination thereof. It is well-known in the art that the various operating conditions will vary depending on the particular spray drying apparatus that is used and can be readily determined by persons having ordinary skill in the art.

The spray dried particles can, optionally, be calcined under an oxidative atmosphere, e.g., air, to produce calcined support particles that include the Group 2 element and Al. In some embodiments, the spray dried particles can be calcined at a temperature in a range of from 450° C., 500° C., 525° C., 550° C., 575° C., 600° C., 625° C., 650° C., or 675° C. to 700° C., 725° C., 750° C., 775° C., 800° C., 850° C., 900° C., or 950° C. In some embodiments, the spray dried particles can be calcined at a temperature of ≤950° C., ≤900° C., ≤850° C., ≤800° C., ≤750° C., ≤700° C., ≤650° C., ≤600° C., or ≤550° C., ≤525° C., ≤500° C., ≤475° C., or ≤460° C. In some embodiments, the spray dried particles can be calcined for a time period of ≤240 minutes ≤180 minutes ≤120 minutes ≤90 minutes, ≤60 minutes, ≤45 minutes, ≤30 minutes, ≤25 minutes, ≤20 minutes, or ≤15 minutes. In some embodiments, the spray dried particles can be calcined in the presence of oxygen, e.g., air. In some embodiments, the spray dried particles can be calcined at a temperature in a range of from 550° C. to 900° C. or 550° C. to 850° C. for a time period of ≤240 minutes ≤180 minutes ≤120 minutes ≤90 minutes, ≤60 minutes, ≤45 minutes, ≤30 minutes, ≤25 minutes, ≤20 minutes, or ≤15 minutes. In other embodiments, the spray dried particles are calcined at a temperature of ≤550° C., ≤540° C., ≤530° C., ≤520° C., ≤510° C., or ≤500° C. for a time period of ≤240 minutes ≤180 minutes ≤120 minutes ≤90 minutes, ≤60 minutes, ≤45 minutes, ≤30 minutes, ≤25 minutes, ≤20 minutes, or ≤15 minutes.

The Group 8-10 element present in the catalyst particles can be introduced via one or more ways. In some embodiments, the process for making the catalyst composition can include (i) contacting Al and/or a compound thereof, the Group 2 element and/or a compound thereof, and the liquid medium with a Group 8-10 element and/or a compound thereof such that the Group 8-10 element can be present in the slurry or the gel and the catalyst composition can include catalyst particles that include the calcined support particles having the Group 8-10 element disposed thereon. In other embodiments, the process for making the catalyst composition can include (ii) depositing a Group 8-10 element and/or a compound thereof on the spray dried particles by contacting the spray dried particles with a Group 8-10 element and/or a compound thereof to produce spray dried particles containing the Group 8-10 element and the catalyst composition can include catalyst particles that include the calcined support particles having the Group 8-10 element disposed thereon. In other embodiments, the process for making the catalyst composition can include (iii) depositing a Group 8-10 element or a compound thereof on the calcined support particles if the spray dried particles are optionally calcined by contacting the calcined support particles with a Group 8-10 element and/or a compound thereof to produce calcined support particles that contain the Group 8-10 element and the process can, optionally, further include calcining the calcined support particles that contain the Group 8-10 element to produce re-calcined support particles having the Group 8-10 element disposed thereon, where the catalyst composition can include the re-calcined support particles. In some embodiments, the catalyst composition can include the Group 8-10 element containing calcined support particles without the optional additional calcination step. In other embodiments, the process for making the catalyst composition can include option (i), (ii), or (iii), (i) and (ii), (i) and (iii), (ii) and (iii), or (i), (ii), and (iii). In some embodiments, when the Group 8-10 element is in the form of a compound, suitable compounds that include the Group 8-10 element can be or can include, but are not limited to, chloroplatinic acid hexahydrate, tetraammineplatinum(II) nitrate, platinum(II) acetylacetonate, platinum(II) bromide, platinum(II) iodide, platinum(II) chloride, platinum(IV) chloride, platinum(II) diammine dichloride, ammonium tetrachloroplatinate(II), tetraammineplatinum(II) chloride hydrate, tetraammineplatinum(II) hydroxide hydrate, nickel (II) chloride, palladium (II) acetate, palladium(II) nitrate, iron (II) chloride, iron (III) chloride, ruthenium(III) chloride hydrate, rhodium(III) nitrate, or any mixture thereof.

The optional promoter that can be present in the catalyst particles can be introduced via one or more ways. In some embodiments, the process for making the catalyst composition can include (iv) contacting at least the Al and/or a compound thereof, the Group 2 element and/or a compound thereof, and the liquid medium with a compound that includes a promoter element such that the promoter element is present in the slurry or the gel and the catalyst composition can include catalyst particles that include the spray dried and/or the calcined support particles having the promoter element disposed thereon. In other embodiments, the process for making the catalyst composition can include (v) depositing a compound that includes a promoter element on the spray dried particles to produce promoter-containing spray dried particles and the catalyst composition can include catalyst particles that include the promoter-containing spray dried particles and/or the calcined support particles having the promoter element disposed thereon. In other embodiments, the process for making the catalyst composition can include (vi) depositing a compound that includes a promoter element on the calcined support particles if the spray dried particles are optionally calcined to produce promoter-containing calcined support particles and the process can further include, optionally, calcining the promoter-containing calcined support particles to produce re-calcined support particles having the promoter element disposed thereon, where the catalyst composition includes the re-calcined support particles. In some embodiments, the catalyst composition can include the promoter-containing calcined support particles without the optional additional calcination step. In other embodiments, the process for making the catalyst composition can include option (iv), (v), (vi), (iv) and (v), (iv) and (vi), (v) and (vi), or (iv), (v), and (vi). In other embodiments, the process can include any one or more of options (i), (ii), and (iii) and any one or more of options (iv), (v), and (iv). The compound that includes the promoter element can be or can include, but is not limited to, tin(II) oxide, tin(IV) oxide, tin(IV) chloride pentahydrate, tin(II) chloride dihydrate, tin(II) bromide, ammonium hexachlorostannate(IV), tin(IV) bromide, tin(II) acetylacetonate, tin(II) acetate, tin(IV) acetate, tin(II) oxalate, silver(I) nitrate, gold(III) nitrate, copper(II) nitrate, gallium(III) nitrate, zinc(II) nitrate, germanium(IV) chloride, indium(III) nitrate, rhenium(VII) oxide or any mixture thereof.

The alkali metal element, if present in the catalyst particles, can be introduced via one or more ways. In some embodiments, the process for making the catalyst composition can include (vii) contacting the Al and/or a compound thereof, the Group 2 element and/or a compound thereof, and the liquid medium with a compound that includes an alkali metal element such that the alkali metal element is present in the slurry or the gel and the catalyst composition can include catalyst particles that include the spray dried and/or the calcined support particles having the alkali metal element disposed thereon. In other embodiments, the process for making the catalyst composition can include (viii) depositing a compound that includes an alkali metal element on the spray dried particles to produce alkali metal element-containing spray dried particles and the catalyst composition can include catalyst particles that include the spray dried particles and/or the calcined support particles having the alkali metal element disposed thereon. In other embodiments, the process for making the catalyst composition can include (ix) depositing a compound that includes an alkali metal element on the calcined support particles if the spray dried particles are optionally calcined to produce alkali metal element-containing calcined support particles and the process can further include, optionally, calcining the alkali metal element-containing calcined support particles to produce re-calcined support particles having the alkali metal element disposed thercon, where the catalyst composition includes the re-calcined support particles. In other embodiments, the process for making the catalyst composition can include option (vii), (viii), (ix), (vii) and (viii), (vi) and (ix), (viii) and (ix), or (vii), (viii), and (iv). In other embodiments, the process can include any one or more of options (i), (ii), and (iii), any one or more of options (iv), (v), and (iv), and any one or more of options (vii), (viii), and (ix). The compound that includes the alkali metal element can be or can include, but are not limited to, lithium nitrate, sodium nitrate, potassium nitrate, rubidium nitrate, cesium nitrate, or any mixture thereof.

In some embodiments, the process for making the catalyst composition can optionally include hydrating the calcined support particles to produce hydrated support particles. For example, the calcined support particles can be contacted with water to produce the hydrated support particles. In such embodiment, the process can also include calcining the hydrated support particles to produce the catalyst composition that includes re-calcined support particles. Hydrating the calcined support can be carried out at a temperature in a range of from 20° C., 40° C., or 60° C. to 80° C., 120° C., 140° C., 160° C., 180° C., or 200° C. The calcined support can be contacted with the water for a time period in a range of from 1 minutes, 5 minutes, or 10 minutes to 20 minutes, 40 minutes, 80 minutes, 160 minutes, 6 hours, 12 hours, 24 hours, or 48 hours. In some embodiments, an anion such as chloride, nitrate, carbonate, bicarbonate, acetate, oxalate, formate, and/or citrate can be present during hydration.

In some embodiments, the process for making the catalyst composition can optionally include hydrating the spray dried particles to produce hydrated spray dried particles. For example, the spray dried particles can be contacted with water to produce the hydrated spray dried particles. In such embodiment, the process can also include calcining the hydrated spray dried particles to produce the catalyst composition that includes calcined support particles. Hydrating the spray dried particles can be carried out at a temperature in a range of from 20° C., 40° C., or 60° C. to 80° C., 120° C., 140° C., 160° C., 180° C., or 200° C. The spray dried particles can be contacted with the water for a time period in a range of from 1 minutes, 5 minutes, or 10 minutes to 20 minutes, 40 minutes, 80 minutes, 160 minutes, 6 hours, 12 hours, 24 hours, or 48 hours. In some embodiments, an anion such as chloride, nitrate, carbonate, bicarbonate, acetate, oxalate, formate, and/or citrate can be present during hydration.

In some embodiments, the process for making the catalyst composition can optionally include hydrating the spray dried particles to produce hydrated spray dried particles, calcining the hydrated spray dried particles to produce calcined support particles, hydrating the calcined support particles to produce hydrated calcined support particles, and calcining the hydrated calcined support particles to produce re-calcined support particles. As such, the catalyst composition can include the spray dried particles, the calcined support particles, the hydrated spray dried particles, the hydrated spray dried particles that can be calcined, the hydrated calcined support particles, the hydrated calcined support particles that can be re-calcined, or any mixture thereof.

In some embodiments, catalysts particles produced by hydrating the calcined support particles or the spray dried particles and then calcining the hydrated calcined support particles or the hydrated spray dried particles can produce catalyst particles that have an attrition loss after one hour that is less than an attrition loss after one hour of the initially calcined particles or the spray dried particles produced before the hydration step, as measured according to ASTM D5757-11(2017). In some embodiments, catalysts particles produced by hydrating the calcined support particles or the spray dried particles and then calcining the hydrated support particles or the hydrated support particles can produce catalyst particles that have an attrition loss after one hour that is 10% less, 30% less, 50% less, 70% less, 90% less, or 100% less, than an attrition loss after one hour of the initially calcined particles produced before the hydration step, as measured according to ASTM D5757-11(2017).

Second Process for Making Catalyst Particles

In some embodiments, the catalyst composition can be or can include catalyst particles produced through only the spray drying step such that the slurry is prepared and spray dried particles are produced therefrom with the Group 8-10 element and, optionally, the promoter and/or the alkali metal element added to the slurry, the spray dried particles, or a combination thereof. Accordingly, in some embodiments the process for making a catalyst composition, can include preparing the slurry or gel that can include Al and/or a compound thereof, a Group 2 element and/or a compound thereof, a liquid medium, and, optionally, the one or more additives as described above and spray drying the slurry or the gel to produce spray dried support particles that include at least the Al and the Group 2 element. At least one of (i) and (ii) can be met: (i) the Group 8-10 element can be present in the slurry or the gel in the form of the Group 8-10 element-containing compound and the catalyst composition can include catalyst particles that include the spray dried support particles having the Group 8-10 element disposed thereon, and (ii) the Group 8-10 element can be deposited on the spray dried support particles by contacting the spray dried support particles with the Group 8-10 element-containing compound to produce Group 8-10 element-containing spray dried support particles and the catalyst composition can include catalyst particles that can include the spray dried support particles having the Group 8-10 element disposed thereon. In some embodiments, at least one of (iii) and (iv) can also be met: (iii) the compound that includes the promoter element can be present in the slurry or the gel and the catalyst composition can include catalyst particles that include the spray dried support particles having the promoter element disposed thereon, and (iv) the compound that can include the promoter element can be deposited on the spray dried support particles to produce promoter-containing spray dried support particles and the catalyst composition can include catalyst particles that include the spray dried support particles having the promoter element disposed thereon. In some embodiments, the optional alkali metal element(s) and/or binders can also be added during the synthesis of the catalyst particles as described above.

In some embodiments, the catalyst particles can be further processed or activated in-situ by adding the catalyst particles into a hydrocarbon upgrading process that subjects the catalyst particles to higher severity conditions to produce catalyst particles having a greater level of activation than just the spray dried particles have upon preparation thereof. In some embodiments, when the catalyst particles include catalyst particles only subjected to the spray drying step such that the slurry is prepared and spray dried support particles are produced therefrom with the Pt and promoter added to the slurry, the spray dried support particles, or a combination thereof, the catalyst particles can be introduced into a reaction zone, a combustion zone, a reduction zone, or any other location within a fluidized hydrocarbon upgrading process some of which are further described below.

The preparation of the catalyst composition and processes for adding the Group 8-10 element, the promoter(s) such as Sn, the optional alkali metal element(s), and the optional binder(s)) to the catalyst composition has been described above. In some embodiments, the preparation of the slurry or gel, spray drying the slurry, calcination of the spray dried particles and/or the hydrated calcined particles, and/or hydration of the Al and Group 2 element containing calcined support particles or the spray-dried particles can also be performed using one of the known methods reported in literature, such as U.S. Pat. Nos. 4,866,019; 6,028,023; 6,589,902; 6,593,265; 6,800,578; 7,361,264; and 7,417,005; U.S. Patent Application Publication Nos. 2004/0029729; 2005/000396; and 2016/0082424; WO Publication No. WO2008083563A1; and journal publications Wang et al., *Ind. Eng. Chem. Res.* 2008, 47, 5746-5750; Chubar et al., *Chem. Eng. J.* 2013, 234,284-299; Valente et al., *Energy Environ. Sci.,* 2011, 4, 4096-4107; and Julklang et al., *Mater. Lett.* 2017, 209, 429-432.

Without wishing to be bound by theory, it is believed that the support produced via any one of the above processes and/or other processes can include (i) the Mg and Al mixed together on the nm scale, (ii) the Mg and Al in the form of a mixed Mg/Al metal oxide, or (iii) a combination of (i) and (ii).

A First Process for Upgrading a Hydrocarbon

The first process for upgrading a hydrocarbon can include contacting a hydrocarbon-containing feed (first hydrocarbon-containing feed) with the catalyst composition that includes the Group 8-10 element disposed on the support to effect one or more of dehydrogenation, dehydroaromatization, and dehydrocyclization of at least a portion of the first hydrocarbon-containing feed to produce a coked catalyst composition and an effluent that can include one or more upgraded hydrocarbons and molecular hydrogen. The catalyst composition and the first hydrocarbon-containing feed can be contacted with one another within any suitable environment such as one or more reaction or conversion zones disposed within one or more reactors to produce the effluent and the coked catalyst composition. The reaction or conversion zone can be disposed or otherwise located within one or more fixed bed reactors, one or more fluidized or moving bed reactors, one or more reverse flow reactors, or any combination thereof. The catalyst composition can include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support.

The first hydrocarbon-containing feed and catalyst composition can be contacted at a temperature in a range from 300° C., 350° C., 400° C., 450° C., 500° C., 550° C., 600° C., 620° C., 650° C., 660° C., 670° C., 680° C., 690° C., or 700° C. to 725° C., 750° C., 760° C., 780° C., 800° C., 825° C., 850° C., 875° C., or 900° C. In some embodiments, the first hydrocarbon-containing feed and the catalyst composition can be contacted at a temperature of at least 620° C., at least 650° C., at least 660° C., at least 670° C., at least 680° C., at least 690° C., or at least 700° C. to 725° C., 750° C., 760° C., 780° C., 800° C., 825° C., 850° C., 875° C., or 900° C. The first hydrocarbon-containing feed can be introduced into the reaction or conversion zone and contacted with the catalyst composition therein for a time period of ≤3 hours, ≤2.5 hours, ≤2 hours, ≤1.5 hours, ≤1 hour, ≤45 minutes, ≤30 minutes, ≤20 minutes, ≤10 minutes, ≤5 minutes, ≤1 minute, ≤30 seconds, ≤10 seconds, ≤5 seconds, or ≤1 second or ≤0.5 second. In some embodiments, the first hydrocarbon-containing feed can be contacted with the catalyst composition for a time period in a range from 0.1 seconds, 0.5 seconds, 0.7 seconds, 1 second, 30 second, 1 minute, 5 minutes, or 10 minutes to 30 minutes, 50 minutes, 70 minutes, 1.5 hours, 2 hours, or 3 hours.

The first hydrocarbon-containing feed and the catalyst composition can be contacted under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatics in the first hydrocarbon-containing feed. In some embodiments, the hydrocarbon partial pressure during contact of the first hydrocarbon-containing feed and the catalyst composition can be in a range from 20 kPa-absolute, 50 kPa-absolute, 70 kPa-absolute, 80 kPa-absolute, 90 kPa-absolute, 95 kPa-absolute, 100 kPa-absolute, 150 kPa, 200 kPa 300 kPa-absolute, 500 kPa-absolute, 750 kPa-absolute, or 1,000 kPa-absolute to 1,500 kPa-absolute, 2,500 kPa-absolute, 4,000 kPa-absolute, 5,000 kPa-absolute, 7,000 kPa-absolute, 8,500 kPa-absolute, or 10,000 kPa-absolute, where the hydrocarbon partial pressure is the total partial pressure of any $C_2$-$C_{16}$ alkanes and any $C_8$-$C_{16}$ alkyl aromatics in the first hydrocarbon-containing feed. In other embodiments, the hydrocarbon partial pressure during contact of the hydrocarbon-containing feed and the catalyst composition can be in a range from 20 kPa-absolute, 50 kPa-absolute, 70 kPa-absolute, 80 kPa-absolute, 90 kPa-absolute, 95 kPa-absolute, 100 kPa-absolute, 150 kPa-absolute, 200 kPa-absolute, 250 kPa-absolute, or 300 kPa-absolute to 500 kPa-absolute, 600 kPa-absolute, 700 kPa-absolute, 800 kPa-absolute, 900 kPa-absolute, or 1,000 kPa-absolute, where the hydrocarbon partial pressure is the total partial pressure of any $C_2$-$C_{16}$ alkanes and any $C_8$-$C_{16}$ alkyl aromatics in the first hydrocarbon-containing feed.

In some embodiments, the first hydrocarbon-containing feed can include at least 60 vol %, at least 65 vol %, at least 70 vol %, at least 75 vol %, at least 80 vol %, at least 85 vol %, at least 90 vol %, at least 95 vol %, or at least 99 vol % of a single $C_2$-$C_{16}$ alkane, e.g., propane, based on a total volume of the first hydrocarbon-containing feed. The first hydrocarbon-containing feed and the catalyst composition can be contacted under a single $C_2$-$C_{16}$ alkane, e.g., propane, pressure of at least 20 kPa-absolute, at least 50 kPa-absolute, at least 70 kPa-absolute, at least 80 kPa-absolute, at least 90 kPa-absolute, at least 95 kPa-absolute, at least 100 kPa-absolute, at least 150 kPa-absolute, at least 250 kPa-absolute, at least 300 kPa-absolute, at least 400 kPa-absolute, at least 500 kPa-absolute, or at least 1,000 kPa-absolute.

The first hydrocarbon-containing feed can be contacted with the catalyst composition within the reaction or conversion zone at any weight hourly space velocity (WHSV) effective for carrying out the upgrading process. In some embodiments, the WHSV can be 0.01 $hr^{-1}$, 0.1 $hr^{-1}$, 1 $hr^{-1}$, 2 $hr^{-1}$, 5 $hr^{-1}$, 10 $hr^{-1}$, 20 $hr^{-1}$, 30 $hr^{-1}$, or 50 $hr^{-1}$ to 100 $hr^{-1}$, 250 $hr^{-1}$, 500 $hr^{-1}$, or 1,000 $hr^{-1}$. In some embodiments, when the hydrocarbon upgrading process includes a fluidized or otherwise moving catalyst composition, a ratio of the catalyst composition circulation mass flow rate to a combined amount of any $C_2$-$C_{16}$ alkanes and any $C_8$-$C_{16}$ alkyl aromatics mass flow rate can be in a range from 1, 3, 5, 10, 15, 20, 25, 30, or 40 to 50, 60, 70, 80, 90, 100, 110, 125, or 150 on a weight to weight basis.

When the activity of the coked catalyst composition decreases below a desired minimum amount, the coked catalyst composition or at least a portion thereof can be subjected to a regeneration process to produce a regenerated catalyst composition. More particularly, the coked catalyst composition can be contacted with one or more oxidants to effect combustion of at least a portion of the coke to produce a regenerated catalyst composition lean in coke and a combustion gas. Regeneration of the coked catalyst composition can occur within the reaction or conversion zone or within a combustion zone that is separate and apart from the reaction or conversion zone, depending on the particular reactor configuration, to produce a regenerated catalyst composition. For example, regeneration of the coked catalyst composition can occur within the reaction or conversion zone when a fixed bed or reverse flow reactor is used, or within a separate combustion zone that can be separate and apart from the reaction or conversion zone when a fluidized bed reactor or other circulating or fluidized type reactor is used.

In some embodiments the process can optionally include contacting at least a portion of the regenerated catalyst composition with a reducing gas to produce a regenerated and reduced catalyst composition. An additional quantity of the hydrocarbon-containing feed can be contacted with at least a portion of the regenerated catalyst composition and/or at least a portion of any regenerated and reduced catalyst composition to produce a re-coked catalyst composition and additional effluent.

In some embodiments, a cycle time from contacting the hydrocarbon-containing feed with the catalyst composition to contacting the additional quantity of the hydrocarbon-containing feed with the regenerated catalyst composition can be ≤5 hours, ≤4 hours, ≤3 hours, ≤2 hours, ≤1.5 hours, ≤1 hour, ≤50 minutes, ≤45 minutes, ≤40 minutes, ≤30 minutes, ≤25 minutes, ≤20 minutes, or ≤15 minutes. The first cycle begins upon contact of the catalyst composition with the first hydrocarbon-containing feed, followed by contact with at least the oxidative gas to produce the regenerated catalyst composition or at least the oxidative gas and the optional reducing gas to produce the regenerated and reduced catalyst composition, and the first cycle ends and a second cycle begins upon contact of the regenerated catalyst composition with the additional quantity of the first hydrocarbon-containing feed. If one or more additional feeds (described in more detail below) are utilized between flows of the first hydrocarbon-containing feed and the oxidative gas, between the oxidative gas and the reducing gas (if used), between the oxidative gas and the additional quantity of the first hydrocarbon-containing feed, and/or between the reducing gas (if used) and the additional quantity of the first hydrocarbon-containing feed, the period of time such stripping gas(es) is/are utilized would be included in the period included in the cycle time. As such, the cycle time from contacting the first hydrocarbon-containing feed with the catalyst composition in step to the contacting the additional quantity of the hydrocarbon-containing feed with the regenerated catalyst composition, in some embodiments, can be ≤5 hours.

The oxidant can be or can include, but is not limited to, $O_2$, $O_3$, $CO_2$, $H_2O$, or a mixture thereof. In some embodiments, an amount of oxidant in excess of that needed to combust 100% of the coke on the catalyst composition can be used to increase the rate of coke removal from the catalyst composition, so that the time needed for coke removal can be reduced and lead to an increased yield in the upgraded product produced within a given period of time. The use of pure $O_2$ as an oxidant can facilitate the capturing and sequestration of $CO_2$ made during combustion in one or more downstream $CO_2$ recovery systems.

The coked catalyst composition and oxidant can be contacted with one another at a temperature in a range from 500° C., 550° C., 600° C., 650° C., 700° C., 750° C., or 800° C. to 900° C., 950° C., 1,000° C., 1,050° C., or 1,100° C. to produce the regenerated catalyst composition. In some embodiments, the coked catalyst composition and oxidant can be contacted with one another at a temperature in a range from 500° C. to 1,100° C., 600° C. to 1,000° C., 650° C. to 950° C., 700° C. to 900° C., or 750° C. to 850° C. to produce the regenerated catalyst composition.

In some embodiments, the coked catalyst composition and oxidant can be contacted with one another for a time period of ≤2 hours, ≤1 hour, ≤30 minutes, ≤10 minutes, ≤5 minutes, ≤1 min, ≤30 seconds, ≤10 seconds, ≤5 seconds, or ≤1 second. For example, the coked catalyst composition and oxidant can be contacted with one another for a time period in a range from 2 seconds to 2 hours. In some embodiments, the coked catalyst composition and oxidant can be contacted for a time period sufficient to remove ≥50 wt %, ≥75 wt %, or ≥90 wt % or >99% of any coke disposed on the catalyst composition.

In some embodiments, the time period the coked catalyst composition and oxidant contact one another can be less than the time period the catalyst composition contacts the hydrocarbon-containing feed to produce the effluent and the coked catalyst composition. For example, the time period the coked catalyst composition and oxidant contact one another can be at least 90%, at least 60%, at least 30%, or at least 10% less than the time period the catalyst composition contacts the hydrocarbon-containing feed to produce the effluent. In other embodiments, the time period the coked catalyst composition and oxidant contact one another can be greater than the time period the catalyst composition contacts the hydrocarbon-containing feed to produce the effluent and the coked catalyst composition. For example, in some embodiments, the coked catalyst composition and oxidant can contact one another for a time period that can be at least 50%, at least 100%, at least 300%, at least 500%, at least 1,000%, at least 10,000%, at least 30,000%, at least 50,000%, at least 75,000%, at least 100,000%, at least 250,000%, at least 500,000%, at least 750,000%, at least 1,000,000%, at least 1,250,000%, at least 1,500,000%, or at least 1,800,000% greater than the time period the catalyst composition contacts the hydrocarbon-containing feed to produce the effluent.

The coked catalyst composition and oxidant can be contacted with one another under an oxidant partial pressure in a range from 20 kPa-absolute, 50 kPa-absolute, 70 kPa-absolute, 80 kPa-absolute, 90 kPa-absolute, 95 kPa-absolute, 100 kPa-absolute, 300 kPa-absolute, 500 kPa-absolute, 750 kPa-absolute, or 1,000 kPa-absolute to 1,500 kPa-absolute, 2,500 kPa-absolute, 4,000 kPa-absolute, 5,000 kPa-absolute, 7,000 kPa-absolute, 8,500 kPa-absolute, or 10,000 kPa-absolute. In other embodiments, the oxidant partial pressure during contact with the coked catalyst composition can be in a range from 20 kPa-absolute, 50 kPa-absolute, 70 kPa-absolute, 80 kPa-absolute, 90 kPa-absolute, 95 kPa-absolute, 100 kPa-absolute, 150 kPa-absolute, 200 kPa-absolute, 250 kPa-absolute, or 300 kPa-absolute to 500 kPa-absolute, 600 kPa-absolute, 700 kPa-absolute, 800 kPa-absolute, 900 kPa-absolute, or 1,000 kPa-absolute to produce the regenerated catalyst composition.

Without wishing to be bound by theory, it is believed that at least a portion of the Group 8-10 element, e.g., Pt, disposed on the coked catalyst composition can be agglomerated as compared to the catalyst composition prior to contact with the first hydrocarbon-containing feed. It is believed that during combustion of at least a portion of the coke on the coked catalyst composition that at least a portion of the Group 8-10 element can be re-dispersed about the support. Re-dispersing at least a portion of any agglomerated Group 8-10 element can improve the stability of the catalyst composition over many cycles.

In some embodiments, at least a portion of the Group 8-10 element, e.g., Pt, in the regenerated catalyst composition can be at a higher oxidized state as compared to the Group 8-10 element in the catalyst composition contacted with the first hydrocarbon-containing feed and as compared to the Group 8-10 element in the coked catalyst composition. As such, as noted above, in some embodiments the process can optionally include contacting at least a portion of the regenerated catalyst composition with a reducing gas to produce a regenerated and reduced catalyst composition. Suitable reducing gases (reducing agent) can be or can include, but are not limited to, $H_2$, CO, $CH_4$, $C_2H_6$, $C_3H_8$, $C_2H_4$, $C_3H_6$, steam, or a mixture thereof. In some embodiments, the reducing agent can be mixed with an inert gas such as Ar, Ne, He, $N_2$, $CO_2$, $H_2O$ or a mixture thereof. In such embodiments, at least a portion of the Group 2 element in the regenerated and reduced catalyst composition can be reduced to a lower oxidation state, e.g., the elemental state, as compared to the Group 2 element in the regenerated catalyst composition. In this embodiment, the additional quantity of the hydrocarbon-containing feed can be contacted with at least a portion of the regenerated catalyst composition and/or at least a portion of the regenerated and reduced catalyst composition.

In some embodiments, the regenerated catalyst composition and the reducing gas can be contacted at a temperature in a range from 400° C., 450° C., 500° C., 550° C., 600° C., 620° C., 650° C., or 670° C. to 720° C., 750° C., 800° C., or 900° C. The regenerated catalyst composition and the reducing gas can be contacted for a time period in a range from 1 second, 5 seconds, 10 seconds, 20 seconds, 30 seconds, or 1 minute to 10 minutes, 30 minutes, or 60 minutes. The regenerated catalyst composition and reducing gas can be contacted at a reducing agent partial pressure of 20 kPa-absolute, 50 kPa-absolute, 70 kPa-absolute, 80 kPa-absolute, 90 kPa-absolute, 95 kPa-absolute, 100 kPa-absolute, 300 kPa-absolute, 500 kPa-absolute, 750 kPa-absolute, or 1,000 kPa-absolute to 1,500 kPa-absolute, 2,500 kPa-absolute, 4,000 kPa-absolute, 5,000 kPa-absolute, 7,000 kPa-absolute, 8,500 kPa-absolute, or 10,000 kPa-absolute. In other embodiments, the reducing agent partial pressure during contact with the regenerated catalyst composition can be in a range from 20 kPa-absolute, 50 kPa-absolute, 70 kPa-absolute, 80 kPa-absolute, 90 kPa-absolute, 95 kPa-absolute, 100 kPa-absolute, 150 kPa-absolute, 200 kPa-absolute, 250 kPa-absolute, or 300 kPa-absolute to 500 kPa-absolute, 600 kPa-absolute, 700 kPa-absolute, 800 kPa-absolute, 900 kPa-absolute, or 1,000 kPa-absolute to produce the regenerated catalyst composition.

At least a portion of the regenerated catalyst composition, the regenerated and reduced catalyst composition, new or fresh catalyst composition, or a mixture thereof can be contacted with an additional quantity of the first hydrocarbon-containing feed within the reaction or conversion zone to produce additional effluent and additional coked catalyst composition. As noted above, in some embodiments, the cycle time from the contacting the hydrocarbon-containing feed with the catalyst composition to the contacting the additional quantity of the hydrocarbon-containing feed with at least a portion of the regenerated catalyst composition, and/or the regenerated and reduced catalyst composition, and optionally with new or fresh catalyst composition can be ≤5 hours.

In some embodiments, as noted above, one or more additional feeds, e.g., one or more sweep fluids, can be utilized between flows of the first hydrocarbon-containing feed and the oxidant, between the oxidant and the optional reducing gas if used, between the oxidant and the additional first hydrocarbon-containing feed, and/or between the reducing gas and the additional first hydrocarbon-containing feed. The sweep fluid can, among other things, purge or otherwise urge undesired material from the reactors, such as non-combustible particulates including soot. In some embodiments, the additional feed(s) can be inert under the dehydrogenation, dehydroaromatization, and dehydrocyclization, combustion, and/or reducing conditions. Suitable sweep fluids can be or can include, but are not limited to, $N_2$, He, Ar, $CO_2$, $H_2O$, $CO_2$, $CH_4$, or a mixture thereof. In some embodiments, if the process utilizes a sweep fluid the duration or time period the sweep fluid is used can be in a range from 1 second, 5 seconds, 10 seconds, 20 seconds, 30 seconds, or 1 minute to 10 minutes, 30 minutes, or 60 minutes.

In some embodiments, the catalyst composition can remain sufficiently active and stable after many cycles, e.g., at least 15, at least 20, at least 30, at least 40, at least 50, at least 60, at least 70, at least 100 cycles, at least 125 cycles, at least 150 cycles, at least 175 cycles, or at least 200 cycles with each cycle time lasting for ≤5 hours, ≤4 hours, ≤3 hours, ≤2 hours, ≤1 hour, ≤50 minutes, ≤45 minutes, ≤30 minutes, ≤15 minutes, ≤10 minutes, ≤5 minutes, ≤1 minute, ≤30 seconds, or ≤10 seconds. In some embodiments, the cycle time can be from 5 seconds, 30 seconds, 1 minute or 5 minutes to 10 minutes, 20 minutes, 30 minutes, 45 minutes, 50 minutes, 70 minutes, 2 hours, 3 ours, 4 hours, or 5 hours. In some embodiments, after the catalyst performance stabilizes (sometimes the first few cycles can have a relatively poor or a relatively good performance, but the performance can eventually stabilize), the process can produce a first upgraded hydrocarbon product yield, e.g., propylene when the hydrocarbon-containing feed includes propane, at an upgraded hydrocarbon selectivity, e.g., propylene, of ≥75%, ≥80%, ≥85%, ≥90%, ≥93%, or ≥95% when initially contacted with the first hydrocarbon-containing feed, and can have a second upgraded hydrocarbon product yield upon completion of the last cycle (at least 15 cycles total) that can be at least 90%, at least 93%, at least 95%, at least 97%, at least 98%, at least 99%, at least 99.5%, or at least 100% of the first upgraded hydrocarbon product yield at an upgraded hydrocarbon selectivity, e.g., propylene, of≥75%, ≥80%, ≥85%, or ≥90%, ≥93%, or ≥95%.

In some embodiments, when the first hydrocarbon-containing feed includes propane and the upgraded hydrocarbon includes propylene, contacting the hydrocarbon-containing feed with the catalyst composition can produce a propylene yield of ≥52%, ≥53%, ≥55%, ≥57%, ≥60%, ≥62%, ≥63%, ≥64%, ≥65%, or ≥66% at a propylene selectivity of ≥75%, ≥80%, ≥85%, ≥90%, 93%, or ≥95%. In some embodiment, when the first hydrocarbon-containing feed includes propane and the upgraded hydrocarbon includes propylene, contacting the hydrocarbon-containing feed with the catalyst composition can produce a propylene yield of ≥52%, ≥53%, ≥55%, ≥57%, ≥60%, ≥62%, ≥63%, ≥64%, ≥65%, or ≥66% at a propylene selectivity of ≥75%, ≥80%, ≥85%, ≥90%, ≥93%, or ≥95% for at least 15, at least 20, at least 30, at least 40, at least 50, at least 60, at least 70, at least 100 cycles, at least 125 cycles, at least 150 cycles, at least 175 cycles, or at least 200 cycles. In some embodiments, when the hydrocarbon-containing feed includes at least 70 vol %, at least 75 vol %, at least 80 vol %, at least 85 vol %, at least 90 vol %, or at least 95 vol % of propane, based on a total volume of the first hydrocarbon-containing feed, is contacted under a propane partial pressure of at least 20 kPa-absolute, a propylene yield of ≥52%, ≥53%, ≥55%, ≥57%, ≥60%, ≥62%, ≥63%, ≥64%, ≥65%, or ≥66% at a propylene selectivity of ≥75%, ≥80%, ≥85%, ≥90%, ≥93%, or ≥95%. In other embodiments, when the hydrocarbon-containing feed includes at least 70 vol %, at least 75 vol %, at least 80 vol %, at least 85 vol %, at least 90 vol %, or at least 95 vol % of propane, based on a total volume of the first hydrocarbon-containing feed, is contacted under a propane partial pressure of at least 20 kPa-absolute, a propylene yield of ≥52%, ≥53%, ≥55%, ≥57%, ≥60%, ≥62%, ≥63%, ≥64%, ≥65%, or ≥66% at a propylene selectivity of ≥75%, ≥80%, ≥85%, ≥90%, ≥93%, or ≥95% can be obtained for at least 15, at least 20, at least 30, at least 40, at least 50, at least 60, at least 70, at least 100 cycles, at least 125 cycles, at least 150 cycles, at least 175 cycles, or at least 200 cycles. It is believed that the propylene yield can be further increased to ≥67%, ≥68%, ≥70%, ≥72%, ≥75%, ≥77%, ≥80%, or ≥82% at a propylene selectivity of ≥75%, ≥80%, ≥85%, ≥90%, ≥93%, or ≥95% for ≥15 cycles, ≥20 cycles, ≥30 cycles, ≥40 cycles, ≥50 cycles, ≥60 cycles, ≥70 cycles, ≥100 cycles, ≥125 cycles, ≥150 cycles, ≥175 cycles, or ≥200 cycles by further optimizing the composition of the support and/or adjusting one or more process conditions. In some embodiments, the propylene yield can be obtained when the catalyst composition is contacted with the hydrocarbon-containing feed at a temperature of ≥620° C., ≥630° C., ≥640° C., ≥650° C., ≥655° C., ≥660° C., ≥670° C., ≥680° C., ≥690° C., ≥700° C., or ≥750° C. for ≥15 cycles, ≥20 cycles, ≥30 cycles, ≥40 cycles, ≥50 cycles, ≥60 cycles, ≥70 cycles, ≥100 cycles, ≥125 cycles, ≥150 cycles, ≥175 cycles, or ≥200 cycles.

Systems suitable for carrying out the processes disclosed herein can include systems that are well-known in the art such as the fixed bed reactors disclosed in WO Publication No. WO2017078894; the fluidized riser reactors and/or downer reactors disclosed in U.S. Pat. Nos. 3,888,762; 7,102,050; 7,195,741; 7,122,160; and 8,653,317; and U.S. Patent Application Publication Nos. 2004/0082824; 2008/0194891; and the reverse flow reactors disclosed in U.S. Pat. No. 8,754,276; U.S. Patent Application Publication No. 2015/0065767; and WO Publication No. WO2013169461.

The first hydrocarbon-containing feed can be or can include, but is not limited to, one or more alkane hydrocarbons, e.g., $C_2$-$C_{16}$ linear or branched alkanes and/or $C_4$-$C_{16}$ cyclic alkanes, and/or one or more alkyl aromatic hydrocarbons, e.g., $C_8$-$C_{16}$ alkyl aromatics. In some embodiments, the first hydrocarbon-containing feed can optionally include 0.1 vol % to 50 vol % of steam, based on a total volume of any $C_2$-$C_{16}$ alkanes and any $C_8$-$C_{16}$ alkyl aromatics in the hydrocarbon-containing feed. In other embodiments, the first hydrocarbon-containing feed can include <0.1 vol % of steam or can be free of steam, based on the total volume of any $C_2$-$C_{16}$ alkanes and any $C_8$-$C_{16}$ alkyl aromatics in the hydrocarbon-containing feed.

The $C_2$-$C_{16}$ alkanes can be or can include, but are not limited to, ethane, propane, n-butane, isobutane, n-pentane, isopentane, n-hexane, 2-methylpentane, 3-methylpentane, 2,2-dimethylbutane, n-heptane, 2-methylhexane, 2,2,3-trimethylbutane, cyclopentane, cyclohexane, methylcyclopentane, ethylcyclopentane, n-propylcyclopentane, 1,3-dimethylcyclohexane, or a mixture thereof. For example, the first hydrocarbon-containing feed can include propane, which can be dehydrogenated to produce propylene, and/or isobutane, which can be dehydrogenated to produce isobutylene. In another example, the first hydrocarbon-containing feed can include liquid petroleum gas (LP gas), which can be in the gaseous phase when contacted with the catalyst composition. In some embodiments, the first hydrocarbon in the hydrocarbon-containing feed can be composed of substantially a single alkane such as propane. In some embodiments, the hydrocarbon-containing feed can include ≥50 mol %, ≥75 mol %, ≥95 mol %, ≥98 mol %, or ≥99 mol % of a single $C_2$-$C_{16}$ alkane, e.g., propane, based on a total moles of all hydrocarbons in the first hydrocarbon-containing feed. In some embodiments, the first hydrocarbon-containing feed can include at least 50 vol %, at least 55 vol %, at least 60 vol %, at least 65 vol %, at least 70 vol %, at least 75 vol %, at least 80 vol %, at least 85 vol %, at least 90 vol %, at least 95 vol %, at least 97 vol %, or at least 99 vol % of a single $C_2$-$C_{16}$ alkane, e.g., propane, based on a total volume of the first hydrocarbon-containing feed.

The $C_8$-$C_{16}$ alkyl aromatics can be or can include, but are not limited to, ethylbenzene, propylbenzene, butylbenzene, one or more ethyl toluenes, or a mixture thereof. In some embodiments, the hydrocarbon-containing feed can include ≥50 mol %, ≥75 mol %, ≥95 mol %, ≥98 mol %, or ≥99 mol % of a single $C_8$-$C_{16}$ alkyl aromatic, e.g., ethylbenzene, based on a total weight of all hydrocarbons in the first hydrocarbon-containing feed. In some embodiments, the ethylbenzene can be dehydrogenated to produce styrene. As such, in some embodiments, the first process for upgrading a hydrocarbon disclosed herein can include propane debydrogenation, butane dehydrogenation, isobutane dehydrogenation, pentane dehydrogenation, pentane dehydrocyclization to cyclopentadiene, naphtha reforming, ethylbenzene dehydrogenation, ethyltoluene dehydrogenation, and the like, In some embodiments, the first hydrocarbon-containing feed can be diluted, e.g., with one or more diluents such as one or more inert gases. Suitable inert gases can be or can include, but are not limited to, Ar, Ne, He, $N_2$, $CO_2$, $CH_4$, or a mixture thereof. If the hydrocarbon containing-feed includes a diluent, the hydrocarbon-containing feed can include 0.1 vol %, 0.5 vol %, 1 vol %, or 2 vol % to 3 vol %, 8 vol %, 16 vol %, or 32 vol % of the diluent, based on a total volume of any $C_2$-$C_{16}$ alkanes and any $C_8$-$C_{16}$ alkyl aromatics in the hydrocarbon-containing feed.

In some embodiments, the first hydrocarbon-containing feed can also include $H_2$. In some embodiments, when the first hydrocarbon-containing feed includes $H_2$, a molar ratio of the $H_2$ to a combined amount of any $C_2$-$C_{16}$ alkane and any $C_8$-$C_{16}$ alkyl aromatic can be in a range from 0.1, 0.3, 0.5, 0.7, or 1 to 2, 3, 4, 5, 6, 7, 8, 9, or 10.

In some embodiments, the first hydrocarbon-containing feed can be substantially free of any steam, e.g., <0.1 vol % of steam, based on a total volume of any $C_2$-$C_{16}$ alkanes and any $C_8$-$C_{16}$ alkyl aromatics in the hydrocarbon-containing feed. In other embodiments, the first hydrocarbon-containing feed can include steam. For example, the first hydrocarbon-containing feed can include 0.1 vol %, 0.3 vol %, 0.5 vol %, 0.7 vol %, 1 vol %, 3 vol %, or 5 vol % to 10 vol %, 15 vol %, 20 vol %, 25 vol %, 30 vol %, 35 vol %, 40 vol %, 45 vol %, or 50 vol % of steam, based on a total volume of any $C_2$-$C_{16}$ alkanes and any $C_8$-$C_{16}$ alkyl aromatics in the first hydrocarbon-containing feed. In other embodiments, the first hydrocarbon-containing feed can include ≤50 vol %, ≤45 vol %, ≤40 vol %, ≤35 vol %, ≤30 vol %, ≤25 vol %, ≤20 vol %, or ≤15 vol % of steam, based on a total volume of any $C_2$-$C_{16}$ alkanes and any $C_8$-$C_{16}$ alkyl aromatics in the first hydrocarbon-containing feed. In other embodiments, the first hydrocarbon-containing feed can include at least 1vol %, at least 3 vol %, at least 5 vol %, at least 10 vol %, at least 15 vol %, at least 20 vol %, at least 25 vol %, or at least 30 vol % of steam, based on a total volume of any $C_2$-$C_{16}$ alkanes and any $C_8$-$C_{16}$ alkyl aromatics in the first hydrocarbon-containing feed.

In some embodiments, the first hydrocarbon-containing feed can include sulfur. For example, the first hydrocarbon-containing feed can include sulfur in a range from 0.5 ppm, 1 ppm, 5 ppm, 10 ppm, 20 ppm 30 ppm, 40 ppm, 50 ppm, 60 ppm, 70 ppm, or 80 ppm to 100 ppm, 150 ppm, 200 ppm, 300 ppm, 400 ppm, or 500 ppm. In other embodiments, the first hydrocarbon-containing feed can include sulfur in a range from 1 ppm to 10 ppm, 10 ppm to 20 ppm, 20 ppm to 50 ppm, 50 ppm to 100 ppm, or 100 ppm to 500 ppm. The sulfur, if present in the first hydrocarbon-containing feed, can be or can include, but is not limited to, H2S, dimethyl disulfide, as one or more mercaptans, or any mixture thereof.

In some embodiments, the first hydrocarbon-containing feed can be substantially free or free of molecular oxygen. In some embodiments, the first hydrocarbon-containing feed can include ≤5 mol %, ≤3 mol %, or ≤1 mol % of molecular oxygen (O2). It is believed that providing a first hydrocarbon-containing feed substantially-free of molecular oxygen substantially prevents oxidative reactions that would otherwise consume at least a portion of the alkane and/or the alkyl aromatic in the first hydrocarbon-containing feed.

A Second Process for Upgrading a Hydrocarbon

In some embodiments, the process for upgrading a hydrocarbon can include the upgrading processes disclosed in U.S. Patent Application Publication No. 2021/0276932. For example, the process for upgrading a hydrocarbon can include (I) contacting the first hydrocarbon-containing feed with the catalyst composition that includes the Group 8-10 element disposed on the support to effect one or more of dehydrogenation, dehydroaromatization, and dehydrocyclization of at least a portion of the first hydrocarbon-containing feed to produce a coked catalyst composition and an effluent that can include one or more upgraded hydrocarbons and molecular hydrogen. The first hydrocarbon-containing feed can include one or more of $C_2$-$C_{16}$ linear or branched alkanes, or one or more of $C_4$-$C_{16}$ cyclic alkanes, or one or more $C_8$-$C_{16}$ alkyl aromatics, or a mixture thereof. The first hydrocarbon-containing feed and catalyst composition can be contacted at a temperature in a range from 300° C. to 900° C., for a time period of ≤3 hours, under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatics in the first hydrocarbon-containing feed. The catalyst composition can include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The one or more upgraded hydrocarbons can include at least one of a dehydrogenated hydrocarbon, a dehydroaromatized hydrocarbon, and a dehydrocyclized hydrocarbon. The process can also include (II) contacting at least a portion of the coked catalyst composition with an oxidant to effect combustion of at least a portion of the coke to produce a regenerated catalyst composition lean in coke and a combustion gas. The process can also include (III) contacting an additional quantity of the first hydrocarbon-containing feed with at least a portion of the regenerated catalyst composition to produce a re-coked catalyst composition and additional effluent. A cycle time from the contacting the first hydrocarbon-containing feed with the catalyst composition in step (I) to the contacting the additional quantity of the first hydrocarbon-containing feed with the regenerated catalyst composition in step (III) can be ≤5 hours.

In some embodiments, at least a portion of the Group 8-10 element in the regenerated catalyst can be at a higher oxidized state as compared to the Group 8-10 element in the catalyst contacted with the first hydrocarbon-containing feed and the process can further include, after step (II) and before step (III), the following step (IIa) contacting at least a portion of the regenerated catalyst with a reducing gas to produce a regenerated and reduced catalyst, where at a least a portion of the Group 8-10 element in the regenerated and reduced catalyst is reduced to a lower oxidation state as compared to the Group 8-10 element in the regenerated catalyst, and where the additional quantity of the hydrocarbon-containing feed can be contacted with at least a portion of the regenerated and reduced catalyst.

A Third Process for Upgrading a Hydrocarbon

In some embodiments, the process for upgrading a hydrocarbon can include the upgrading processes disclosed in U.S. Patent Application Publication No. 2021/0276002. For example, the process for upgrading a hydrocarbon can include (I) contacting the first hydrocarbon-containing feed with fluidized catalyst particles that can include the Group 8-10 element disposed on the support within a conversion zone to effect one or more of dehydrogenation, dehydroaromatization, and dehydrocyclization of at least a portion of the first hydrocarbon-containing feed to produce a conversion effluent that can include coked catalyst particles, one or more upgraded hydrocarbons, and molecular hydrogen. The first hydrocarbon-containing feed can include one or more of $C_2$-$C_{16}$ linear or branched alkanes, one or more of $C_4$-$C_{16}$ cyclic alkanes, one or more of $C_8$-$C_{16}$ alkyl aromatic hydrocarbons, or a mixture thereof. The first hydrocarbon-containing feed and the fluidized catalyst particles can be contacted at a temperature in a range from 300° C. to 900° C., for a time period in a range from 0.1 seconds to 2 minutes, and under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatic hydrocarbons in the first hydrocarbon-containing feed. The catalyst particles can include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The one or more upgraded hydrocarbons can include a dehydrogenated hydrocarbon, a dehydroaromatized hydrocarbon, a dehydrocylized hydrocarbon, or a mixture thereof. The process can also include (II) obtaining from the conversion effluent a first gaseous stream rich in the one or more upgraded hydrocarbons and the molecular hydrogen and a first particle stream rich in the coked catalyst particles. The process can also include (III) contacting at least a portion of the coked catalyst particles in the first particle stream with an oxidant in a combustion zone to effect combustion of at least a portion of the coke to produce a combustion effluent that can include regenerated catalyst particles lean in coke and a combustion gas. The process can also include (IV) obtaining from the combustion effluent a second gaseous stream rich in the combustion gas and a second particle stream rich in the regenerated catalyst particles. The process can also include (V) contacting an additional quantity of the first hydrocarbon-containing feed with fluidized regenerated catalyst particles to produce additional conversion effluent comprising re-coked catalyst particles, additional one or more upgraded hydrocarbons, and additional molecular hydrogen.

In some embodiments, the process can further include, after step (IV) and before step (V), the following step (IVa) contacting at least a portion of the regenerated catalyst particles with a reducing gas to produce regenerated and reduced catalyst particles, where the additional quantity of the hydrocarbon-containing feed can be contacted with fluidized regenerated and reduced catalyst particles in step (V).

A Fourth Process for Upgrading a Hydrocarbon

In some embodiments, the process for upgrading a hydrocarbon can include a first multi-stage upgrading processes disclosed in WO Publication No. 2021/225747. For example, the upgrading process can be a multi-stage hydrocarbon upgrading process that can include (I) contacting the first hydrocarbon-containing feed with a first catalyst composition that can include the Group 8-10 element disposed on the support within a first conversion zone to effect one or more of dehydrogenation, dehydroaromatization, and dehydrocyclization of a portion of the first hydrocarbon-containing feed to produce a first conversion zone effluent that can include one or more upgraded hydrocarbons, molecular hydrogen, and unconverted first hydrocarbon-containing feed. The process can also include (II) contacting the first conversion zone effluent with a second catalyst composition that can include the Group 8-10 element disposed on the support within a second conversion zone to effect one or more of dehydrogenation, dehydroaromatization, and dehydrocyclization of at least a portion of the unconverted first hydrocarbon-containing feed to produce a second conversion zone effluent that can include an additional quantity of one or more upgraded hydrocarbons and molecular hydrogen. The first hydrocarbon-containing feed can include one or more of $C_2$-$C_{16}$ linear or branched alkanes, one or more of $C_4$-$C_{16}$ cyclic alkanes, one or more of $C_8$-$C_{16}$ alkyl aromatic hydrocarbons, or a mixture thereof. The first hydrocarbon-containing feed and the first catalyst composition can be contacted for a time period in a range from 0.1 seconds to 3 hours, under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatic hydrocarbons in the first hydrocarbon-containing feed. The first conversion zone effluent and the second catalyst composition can be contacted for a time period in a range from 0.1 seconds to 3 hours, under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatic hydrocarbons in the first conversion zone effluent. The first conversion zone effluent can have a temperature in a range from 300° C. to 850° C. The second conversion zone effluent can have a temperature in a range from 350° C. to 900° C. A temperature of the second conversion zone effluent can be greater than a temperature of the first conversion zone effluent. The first catalyst composition and the second catalyst composition can have the same composition or a different composition. The first catalyst composition and the second catalyst composition each include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The one or more upgraded hydrocarbons can include a dehydrogenated hydrocarbon, a dehydroaromatized hydrocarbon, a dehydrocylized hydrocarbon, or a mixture thereof.

In some embodiments, at least one of the first catalyst composition and the second catalyst composition can be disposed within a fixed bed. In some embodiments, the first conversion zone and the second conversion zone can be disposed within a fixed-bed reactor. In some embodiments, the first conversion zone and the second conversion zone can be disposed within a reverse-flow reactor. In some embodiments, at least one of the first catalyst and the second catalyst can be in the form of fluidized catalyst particles. In some embodiments, the first catalyst and the second catalyst can be in the form of fluidized catalyst particles. In some embodiments, the first and second conversion zones can be substantially adiabatic.

In some embodiments, the process can further include, after step (I) and before step (II), the following step: (Ia) contacting the first conversion zone effluent with one or more intermediate catalyst compositions that can include the Group 8-10 element disposed on the support within one or more intermediate conversion zones to effect one or more of dehydrogenation, dehydroaromatization, and dehydrocyclization of a portion of the unconverted hydrocarbon-containing feed in the first conversion zone effluent to produce one or more coked intermediate catalysts and one or more intermediate conversion zone effluents having one or more intermediate temperatures that can include unconverted hydrocarbon-containing feed and an additional quantity of one or more upgraded hydrocarbons and molecular hydrogen, where a last intermediate conversion zone effluent is contacted with the second catalyst in the second conversion zone in step (II). In some embodiments, if the process includes the optional step (Ia), the one or more intermediate temperatures of the one or more intermediate conversion zone effluents can be greater than the temperature of the first conversion zone effluent, and the temperature of the second conversion zone effluent can be greater than the one or more intermediate temperatures of the one or more intermediate conversion zone effluents.

In some embodiments, contacting the hydrocarbon-containing feed with the first catalyst can produce a coked first catalyst and contacting the first conversion zone effluent with the second catalyst can produce a coked second catalyst, and the process can further include step (III) that can include contacting the coked first catalyst, the coked second catalyst, or the coked first catalyst and the coked second catalyst with an oxidant to effect combustion of at least a portion of the coke to produce a combustion gas and a regenerated first catalyst, a regenerated second catalyst, or a regenerated first catalyst and a regenerated second catalyst. In some embodiments, in step (III) the coked first catalyst particles, the coked second catalyst particles, or the coked first catalyst particles and the coked second catalyst particles and oxidant can be contacted at a temperature in a range from 580° C. to 1,100° C., preferably from 650° C. to 1,000° C., more preferably from 700° C. to 900° C., or more preferably from 750° C. to 850° C. In some embodiments, the process can also include (IV) contacting at least a portion of any regenerated first catalyst, at least a portion of any regenerated second catalyst, or at least a portion of any regenerated first catalyst and at least a portion of any regenerated second catalyst with a reducing gas to produce a regenerated and reduced first catalyst, a regenerated and reduced second catalyst, or a regenerated and reduced first catalyst and a regenerated and reduced second catalyst.

A Fifth Process for Upgrading a Hydrocarbon

In other embodiments, the process for upgrading a hydrocarbon can include a second multi-stage upgrading processes disclosed in WO Publication No. 2021/225747. For example, the multi-stage hydrocarbon upgrading process can include (I) contacting the first hydrocarbon-containing feed with a first plurality of fluidized catalyst particles that can include the Group 8-10 element disposed on the support within a first conversion zone to effect one or more of dehydrogenation, dehydroaromatization, and dehydrocyclization of a first portion of the first hydrocarbon-containing feed to produce a first conversion zone effluent that can include coked first catalyst particles, one or more upgraded hydrocarbons, molecular hydrogen, and unconverted first hydrocarbon-containing feed. The process can also include (II) contacting the first conversion zone effluent with a second plurality of fluidized catalyst particles that can include the Pt and the promoter disposed on the support within a second conversion zone to effect one or more of dehydrogenation, dehydroaromatization, and dehydrocyclization of at least a portion of the unconverted first hydrocarbon-containing feed to produce a second conversion zone effluent that can include coked second catalyst particles, an additional quantity of upgraded hydrocarbons, and an additional quantity of molecular hydrogen. The first hydrocarbon-containing feed can include one or more of $C_2$-$C_{16}$ linear or branched alkanes, one or more of $C_4$-$C_{16}$ cyclic alkanes, one or more of $C_8$-$C_{16}$ alkyl aromatic hydrocarbons, or a mixture thereof. The first hydrocarbon-containing feed and the first plurality of fluidized catalyst particles can be contacted for a time period in a range from 0.1 seconds to 2 minutes, under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatic hydrocarbons in the first hydrocarbon-containing feed. The first conversion zone effluent and the second plurality of fluidized catalyst particles can be contacted for a time period in a range from 0.1 seconds to 2 minutes, under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatic hydrocarbons in the first conversion zone effluent. The first conversion zone effluent can have a temperature in a range from 300° C. to 850° C. The second conversion zone effluent can have a temperature in a range from 350° C. to 900° C. A temperature of the second conversion zone effluent can be greater than a temperature of the first conversion zone effluent. The first plurality of fluidized catalyst particles and the second plurality of fluidized catalyst particles can each include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The one or more upgraded hydrocarbons can include a dehydrogenated hydrocarbon, a dehydroaromatized hydrocarbon, a dehydrocylized hydrocarbon, or a mixture thereof. The process can also include (III) obtaining from the second conversion zone effluent a first gaseous stream rich in the upgraded hydrocarbons and molecular hydrogen and a first particle stream rich in the coked first catalyst particles and the coked second catalyst particles.

The process can also include (IV) splitting the first particle stream into a second particle stream and a third particle stream. The process can also include (V) recycling the second particle stream to the first conversion zone as the first plurality of fluidized particles. The process can also include (VI) contacting the third particle stream with an oxidant in a combustion zone to effect combustion of at least a portion of the coke to produce a combustion effluent that can include regenerated catalyst particles lean in coke and a combustion gas. The process can also include (VII) obtaining from the combustion effluent a second gaseous stream rich in the combustion gas and a fourth particle stream rich in the regenerated catalyst particles. The process can also include (VIII) recycling the fourth particle stream to the second conversion zone as the second plurality of fluidized catalyst particles.

In some embodiments, the process can also include, after step (VII) and before step (VIII), the following step (VIIa) contacting at least a portion of the fourth particle stream with a reducing gas to produce regenerated and reduced catalyst particles, where the regenerated and reduced catalyst particles can be recycled to the second conversion zone as the second plurality of fluidized catalyst particles in step (VIII). In some embodiments, step (IV) can optionally include separating a fifth particle stream from the first particle stream and the process can optionally include contacting the fourth particle stream with the fifth particle stream to produce a combined particle stream.

In some embodiments, the process can optionally include, after step (I) and before step (II), the following step (Ia) contacting the first conversion zone effluent with one or more intermediate pluralities of fluidized catalyst particles that include the Group 8-10 element disposed on the support within one or more intermediate conversion zones to effect one or more of dehydrogenation, dehydroaromatization, and dehydrocyclization of a portion of the unconverted hydrocarbon-containing feed in the first conversion zone effluent to produce one or more coked intermediate pluralities of fluidized catalyst particles and one or more intermediate conversion zone effluents that can have one or more intermediate temperatures that can include unconverted hydrocarbon-containing feed and an additional quantity of one or more upgraded hydrocarbons and molecular hydrogen, where a last intermediate conversion zone effluent can be contacted with the second catalyst in the second conversion zone in step (II).

A Sixth Process for Upgrading a Hydrocarbon

In some embodiments, the process for upgrading a hydrocarbon can include the upgrading processes disclosed in U.S. Patent Application No. 63/062,084. For example, the upgrading process can include (I) introducing the first hydrocarbon-containing feed that can include one or more of $C_2$-$C_{16}$ linear or branched alkanes, one or more of $C_4$-$C_{16}$cyclic alkanes, one or more of $C_8$-$C_{16}$ alkyl aromatics, or a mixture thereof into a reaction zone. The process can also include (II) contacting the first hydrocarbon-containing feed with the catalyst composition that can include the Group 8-10 element disposed on the support disposed within the reaction zone to effect at least one of dehydrogenation, dehydroaromatization, and dehydrocyclization of at least a portion of the first hydrocarbon-containing feed to produce a coked catalyst composition and a first effluent that can include one or more upgraded hydrocarbons and molecular hydrogen. The first hydrocarbon-containing feed and the catalyst composition can be contacted at a temperature in a range from 300° C. to 900° C., for a time period of 1 minute to 90 minutes, under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatics in the hydrocarbon-containing feed. The catalyst composition can include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The process can also include (III) halting introduction of the first hydrocarbon-containing feed into the reaction zone; (IV) introducing an oxidant into the reaction zone; (V) contacting the oxidant with the coked catalyst composition to effect combustion of at least a portion of the coke to produce a regenerated catalyst composition lean in coke and a second effluent comprising a combustion gas, wherein the oxidant and the coked catalyst composition are contacted for a time period of 1 minute to 90 minutes; and (VI) halting introduction of the oxidant into the reaction zone. The process can also include (VII) introducing a reducing gas into the reaction zone; (VIII) contacting the reducing gas with the regenerated catalyst composition to produce a regenerated and reduced catalyst composition and a third effluent, wherein the reducing gas and the regenerated catalyst composition are contacted for a time period of 0.1 seconds to 90 minutes; and (IX) halting introduction of the reducing gas into the reaction zone. The process can also include (X) introducing an additional quantity of the first hydrocarbon-containing feed into the reaction zone and (XI) contacting the additional quantity of the first hydrocarbon-containing feed with the regenerated and reduced catalyst composition to produce a re-coked catalyst composition and additional first effluent. The additional quantity of the first hydrocarbon-containing feed and the regenerated and reduced catalyst composition can be contacted at a temperature in a range from 300° C. to 900° C., for a time period of 1 minute to 90 minutes, under a hydrocarbon partial pressure of at least 20 kPa-absolute, where the hydrocarbon partial pressure is the total partial pressure of any $C_2$-$C_{16}$ alkanes and any $C_8$-$C_{16}$ alkyl aromatics in the first hydrocarbon-containing feed.

In some embodiments, the process can optionally include, after step (III) and before step (IV), the following step ($III_{a1}$) introducing a stripping gas into the reaction zone to remove at least a portion of any residual hydrocarbon-containing feed, first effluent, or both from the reaction zone; ($III_{a2}$) removing at least a portion of any residual hydrocarbon containing feed, effluent, or both from the reaction zone by subjecting the reaction zone to a pressure of less than atmospheric pressure; or a combination of steps ($III_{a1}$) and ($III_{a2}$). In some embodiments, the process can optionally include, after step (VI) and before step (VII), the following step: ($VI_{a1}$) introducing a stripping gas into the reaction zone to remove at least a portion of any residual oxidant, second effluent, or both from the reaction zone; ($VI_{a2}$) removing at least a portion of any residual oxidant, second effluent, or both from the reaction zone by subjecting the reaction zone to a pressure of less than atmospheric pressure; or a combination of steps ($VI_{a1}$) and ($VI_{a2}$)

In some embodiments, the process can optionally include, after step (IX) and before step (X), the following step ($IX_{a1}$) introducing a stripping gas into the reaction zone to remove at least a portion of any residual reducing gas, third effluent, or both from the reaction zone; ($IX_{a2}$) removing at least a portion of any residual reducing gas, third effluent, or both from the reaction zone by subjecting the reaction zone to a pressure of less than atmospheric pressure; or a combination of steps ($IX_{a1}$) and ($IX_{a2}$). In some embodiments, step (IV)

of the process can optionally include introducing a fuel with the oxidant into the reaction zone; and combusting at least a portion of the fuel within the reaction zone to produce heat that heats the reaction zone to a temperature of ≥580° C., ≥620° C., ≥650° C., ≥680° C., ≥710° C., ≥740° C., ≥770° C., ≥800° C., ≥850° C., ≥900° C., or ≥1,000° C.

A Seventh Process for Upgrading a Hydrocarbon

In some embodiments, the process for upgrading a hydrocarbon can include the upgrading processes disclosed in U.S. Patent Application No. 63/195,966. For example, the process can include (I) contacting the first hydrocarbon-containing feed with the catalyst composition that can include the Group 8-10 element disposed on the support to effect one or more of dehydrogenation, dehydroaromatization, and dehydrocyclization of at least a portion of the hydrocarbon-containing feed to produce an at least partially deactivated catalyst composition that can include the Group 8-10 clement disposed on the support and a contaminant and an effluent that can include one or more upgraded hydrocarbons and molecular hydrogen. The first hydrocarbon-containing feed can include one or more of $C_2$-$C_{16}$ linear or branched alkanes, or one or more of $C_4$-$C_{16}$ cyclic alkanes, one or more $C_8$-$C_{16}$ alkyl aromatics, or a mixture thereof. The catalyst composition can include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The first hydrocarbon-containing feed and the catalyst composition can be contacted at a temperature in a range from 300° C. to 900° C. The one or more upgraded hydrocarbons can include at least one of a dehydrogenated hydrocarbon, a dehydroaromatized hydrocarbon, and a dehydrocyclized hydrocarbon. The process can also include (II) heating the at least partially deactivated catalyst composition using a heating gas mixture that can include $H_2O$ at a concentration of greater than 5 mol %, based on the total moles in the heating gas mixture to produce a precursor catalyst composition. The process can also include (III) providing an oxidative gas that can include no greater than 5 mol % of $H_2O$, based on the total moles in the oxidative gas. The process can also include (IV) contacting the precursor catalyst composition at an oxidizing temperature in a range of from 620° C. to 1,000° C. with the oxidative gas for a duration of at least 30seconds to produce an oxidized precursor catalyst composition. The process can also include (V) obtaining a regenerated catalyst composition from the oxidized precursor catalyst composition. The process can also include (VI) contacting an additional quantity of the first hydrocarbon-containing feed with at least a portion of the regenerated catalyst composition to produce additional at least partially deactivated catalyst composition and additional effluent. In some embodiments, the heating gas mixture can be produced by combusting a fuel with an oxidizing gas. In some embodiments, the fuel can include at least one of $H_2$, CO, and a hydrocarbon and the oxidizing gas can include $O_2$. In some embodiments, the oxidative gas can be or can include, but is not limited to, $O_2$, $O_3$, $CO_2$, or a mixture thereof and can include no greater than 5 mol % of $H_2O$.

An Eighth Process for Upgrading a Hydrocarbon

In some embodiments, the process for upgrading a hydrocarbon can include the upgrading processes disclosed in U.S. Patent Application No. 63/232,959. For example, the process for upgrading a hydrocarbon can include (I) contacting the first hydrocarbon-containing feed with fluidized dehydrogenation catalyst particles that can include the Group 8-10 element disposed on the support in a conversion zone to effect dehydrogenation of at least a portion of the hydrocarbon-containing feed to produce a conversion effluent that can include coked catalyst particles and one or more dehydrogenated hydrocarbons. The fluidized dehydrogenation catalyst particles can include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The first hydrocarbon-containing feed can include one or more of $C_2$-$C_{16}$ linear or branched alkanes, one or more of $C_4$-$C_{16}$ cyclic alkanes, one or more of $C_8$-$C_{16}$ alkyl aromatic hydrocarbons, or a mixture thereof. The first hydrocarbon-containing feed can contact the catalyst particles at a weight hourly space velocity in a range from 0.1 $hr^{-1}$ to 1,000 $hr^{-1}$, based on the weight of any $C_2$-$C_{16}$ alkanes and any $C_8$-$C_{16}$ aromatic hydrocarbons in the first hydrocarbon-containing feed. A weight ratio of the fluidized dehydrogenation catalyst particles to a combined amount of any $C_2$-$C_{16}$ alkanes and any $C_8$-$C_{16}$ aromatic hydrocarbons can be in a range from 3 to 100. The first hydrocarbon-containing feed and the catalyst particles can be contacted at a temperature in a range from 600° C. to 750° C. The process can also include (II) separating from the conversion effluent a first particle stream rich in the coked catalyst particles and a first gaseous stream rich in the one or more dehydrogenated hydrocarbons. The process can also include (III) contacting at least a portion of the coked catalyst particles in the first particle stream with an oxidant and a fuel in a combustion zone to effect combustion of at least a portion of the coke to produce a combustion effluent that can include catalyst particles lean in coke and a combustion gas. A dehydrogenation activity of the catalyst particles lean in coke can be less than a dehydrogenation activity of the coked catalyst particles. The process can also include (IV) separating a second particle stream rich in the catalyst particles lean in coke and a second gaseous stream rich in the combustion gas from the combustion effluent. The process can also include (V) contacting at least a portion of the catalyst particles lean in coke in the second particle stream with an oxidative gas in an oxygen soak zone at an oxidizing temperature in a range from 620° C. to 1,000° C. for a duration of at least 30 seconds to produce conditioned catalyst particles having an activity that can be less than the coked catalyst particles. The process can also include (VI) contacting at least a portion of the conditioned catalyst particles with a reducing gas in a reduction zone to produce regenerated catalyst particles having a dehydrogenation activity that can be greater than the coked catalyst particles. The process can also include (VII) contacting an additional quantity of the hydrocarbon-containing feed with at least a portion of the regenerated catalyst particles in the conversion zone to produce an additional quantity of the conversion effluent that can include re-coked catalyst particles and an additional quantity of the one or more dehydrogenated hydrocarbons. The process can also include (VIII) cooling the first gaseous stream to produce a cooled gaseous stream. The process can also include (IX) compressing at least a portion of the cooled gaseous stream to produce a compressed gaseous stream. The process can also include (X) separating a plurality of products from the compressed gaseous stream.

In some embodiments, the first gaseous stream rich in the one or more dehydrogenated hydrocarbons can further include entrained coked catalyst particles. In such embodiment, step (VIII) can include: (VIIIa) contacting the first gaseous stream with a first quench medium, indirectly transferring heat from the first gaseous stream to a first heat transfer medium, or a combination thereof, to produce the cooled gaseous stream, and (VIIIb) contacting the cooled gaseous stream with a second quench medium within a quench tower, (VIIIc) recovering a third gaseous stream that can include the one or more dehydrogenated hydrocarbons and a slurry stream that can include at least a portion of the second quench medium in a liquid phase and the entrained coked catalyst particles from the quench tower, and step (IX) can include compressing at least a portion of the third gaseous stream to produce the compressed gaseous stream. In some embodiments, the conversion effluent can further include benzene, and the process can further include (XI) withdrawing a benzene product stream from the quench tower.

A Ninth Process for Upgrading a Hydrocarbon

In some embodiments, the process for upgrading alkanes and/or alkyl aromatic hydrocarbons can include the processes disclosed in U.S. Patent Application No. 63/231,939. For example, the process for upgrading a hydrocarbon can include (I) contacting the first hydrocarbon-containing feed with fluidized dehydrogenation catalyst particles that can include the Group 8-10 element disposed on the support in a conversion zone to effect dehydrogenation of at least a portion of the first hydrocarbon-containing feed to produce a conversion effluent that can include coked catalyst particles and one or more dehydrogenated hydrocarbons. The fluidized dehydrogenation catalyst particles can include a contaminant, 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The process can also include (II) separating from the conversion effluent a first stream rich in the coked catalyst particles and lean in the one or more dehydrogenated hydrocarbons and a second stream rich in the one or more dehydrogenated hydrocarbons and containing entrained coked catalyst particles. The process can also include (III) contacting the second stream with a first quench medium to produce a cooled second stream. The process can also include (IV) contacting the cooled second stream with a second quench medium within a quench tower. The process can also include (V) recovering a gaseous stream that can include the one or more dehydrogenated hydrocarbons, a condensed first quench medium stream, and a slurry stream that can include at least a portion of the second quench medium in a liquid phase and the entrained coked catalyst particles from the quench tower. The process can also include (VI) recycling at least a portion of the condensed first quench medium to step (III). The process can also include (VII) separating at least a portion of the entrained coked catalyst particles from the slurry stream to provide a recovered second quench medium stream and a recovered entrained coked catalyst particles stream. The process can also include (VIII) recycling at least a portion of the recovered second quench medium stream to step (IV).

In some embodiments, the process can also include (IX) contacting at least a portion of the coked catalyst particles in the first stream and at least a portion of the coked catalyst particles in the recovered entrained catalyst particles stream with an oxidant and optionally a fuel in a combustion zone to effect combustion of at least a portion of the coke and, if present, the fuel to produce a combustion effluent that can include regenerated catalyst particles lean in coke and a combustion gas; (X) separating a combustion gas stream and a regenerated catalyst particles stream; and (XI) contacting an additional quantity of the first hydrocarbon-containing feed with fluidized regenerated catalyst particles from the regenerated catalyst particles stream to produce additional conversion effluent comprising re-coked catalyst particles and additional one or more dehydrogenated hydrocarbons.

In some embodiments, the process can optionally further include (XII) conveying at least a portion of the recovered entrained catalyst particles stream to a metal reclamation facility; and (XIII) recovering at least a portion of the Group 8-10 element from the coked catalyst particles in the recovered entrained coked catalyst particles stream. In some embodiments, the process can further include (XIV) cooling the slurry stream prior to step (VII) to produce a cooled slurry stream. In some embodiments, the conversion effluent can also include benzene and the process can further include (XV) withdrawing a benzene product stream from the quench tower.

A Tenth Process for Upgrading a Hydrocarbon

In some embodiments, the process for upgrading alkanes can include the processes disclosed in U.S. Patent Application No. 63/222,733. For example, a process for dehydrogenating an alkane can include introducing the first hydrocarbon-containing feed that includes one or more alkanes, e.g., propane, into a reactor that can include the catalyst composition that can include the Group 8-10 element disposed on the support disposed therein. The catalyst composition can include a contaminant and 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The process can also include contacting the first hydrocarbon-containing feed with the catalyst composition in the reactor to form a high temperature dehydrogenated product, the high temperature dehydrogenated product including at least a portion of the catalyst composition. The process can also include separating at least a portion of the catalyst composition from the high temperature dehydrogenated product in a primary separation device and a secondary separation device downstream of and in fluid communication with the primary separation device. The process can also include following the exit of high temperature dehydrogenation product from the secondary separation device, combining the high temperature dehydrogenation product with a quench stream, to cool the high temperature dehydrogenation product and form an intermediate temperature dehydrogenation product, where the quench stream includes a hydrocarbon. The process can also include cooling the intermediate temperature dehydrogenation product to form a cooled dehydrogenation product.

In some embodiments, the quench stream can include a liquid hydrocarbon and the intermediate temperature product can be completely in a vapor phase. In some embodiments, the combining of the high temperature dehydrogenation product with the quench stream can occur within a plenum section of the reactor. In some embodiments, the process can further include further cooling, downstream of the reactor, the cooled dehydrogenation product with a heat exchanger or a secondary quench stream, where the quench stream can include at least a portion of the cooled dehydrogenation product after having been further cooled by the heat exchanger or the secondary quench stream.

It should be understood that the second through the tenth processes for upgrading a hydrocarbon can include the same or similar process conditions such as operating temperatures, pressures, time intervals for certain steps, WHSV, etc. as described with regard to the first process for upgrading a hydrocarbon, as will be apparent to those skilled in the art.

Recovery and Use of the First Upgraded Hydrocarbon

In some embodiments, the first upgraded hydrocarbon produced via any one of the first through the tenth hydrocarbon upgrading processes can include at least one upgraded hydrocarbon, e.g., an olefin, water, unreacted hydrocarbons, molecular hydrogen, etc. The first upgraded hydrocarbon can be recovered or otherwise obtained via any convenient process, e.g., by one or more conventional processes. One such process can include cooling and/or compressing the effluent to condense at least a portion of any water and any heavy hydrocarbon that may be present, leaving the olefin and any unreacted alkane or alkyl aromatic primarily in the vapor phase. Olefin and unreacted alkane or alkyl aromatic hydrocarbons can then be removed from the reaction product in one or more separator drums. For example, one or more splitters or distillation columns can be used to separate the dehydrogenated product from the unreacted first hydrocarbon-containing feed.

In some embodiments, a recovered olefin, e.g., propylene, can be used for producing polymer, e.g., recovered propylene can be polymerized to produce polymer having segments or units derived from the recovered propylene such as polypropylene, ethylene-propylene copolymer, etc. Recovered isobutene can be used, e.g., for producing one or more of: an oxygenate such as methyl tert-butyl ether, fuel additives such as diisobutene, synthetic elastomeric polymer such as butyl rubber, etc.

A Process for Regenerating a Catalyst

In some embodiments, a process for regenerating the catalyst composition can include the regenerating processes disclosed in U.S. Patent Application No. 63/195,966. For example, the regenerating process that can be used to regenerate an at least partially deactivated catalyst composition that can include a contaminant and 0.001 wt % to 6 wt % of the Group 8-10 clement disposed on the support, the support including Al and at least 0.5 wt % of the Group 2 element and is free of Si or contains <0.5 wt % of Si, where all weight percent values are based on the weight of the support. In some embodiments, the contaminant can be or can include coke. The process can include (I) heating the at least partially deactivated catalyst composition using a heating gas mixture that can include $H_2O$ at a concentration of greater than 5 mol %, based on the total moles in the heating gas mixture to produce a precursor catalyst composition. The process can also include (II) providing an oxidative gas that can include no greater than 5 mol % of $H_2O$, based on the total moles in the oxidative gas. The process can also include (III) contacting the precursor catalyst composition at an oxidizing temperature in a range of from 620° C. to 1,000° C. with the oxidative gas for a duration of at least 30 seconds, preferably at least 1 minute, preferably at least 5 minutes, to produce an oxidized precursor catalyst composition. The process can also include (IV) obtaining a regenerated catalyst composition from the oxidized precursor catalyst composition. In some embodiments, the heating gas mixture can be produced by combusting a fuel with an oxidizing gas. In some embodiments, the fuel can include at least one of $H_2$, CO, and a hydrocarbon and the oxidizing gas can include $O_2$. In some embodiments, the oxidative gas can be or can include, but is not limited to, $O_2$, $O_3$, $CO_2$, or a mixture thereof and can include no greater than 5 mol % of $H_2O$.

An Eleventh Process for Upgrading a Hydrocarbon

The eleventh process for upgrading a hydrocarbon can include contacting a hydrocarbon-containing feed (a second hydrocarbon-containing feed) with the catalyst composition that includes the Group 8-10 element disposed on the support to effect reforming of at least a portion of the second hydrocarbon-containing feed to produce a coked catalyst composition and an effluent that can include carbon monoxide and molecular hydrogen. The catalyst composition can include 0.001 wt % to 6 wt % of the Group 8-10 element disposed on the support, the support including Al and at least 0.5 wt % of the Group 2 element and is free of Si or contains <0.5 wt % of Si, where all weight percent values are based on the weight of the support. The catalyst composition and the second hydrocarbon-containing feed can be contacted with one another within any suitable environment such as one or more reaction or conversion zones disposed within one or more reactors to produce the effluent and the coked catalyst composition. The reaction or conversion zone can be disposed or otherwise located within one or more fixed bed reactors, one or more fluidized or moving bed reactors, one or more reverse flow reactors, or any combination thereof. For clarity and ease of description, the reforming reaction will be discussed in the context of a fluidized bed reactor, but it should be understood that fixed bed reactors, reverse flow or moving bed reactors, or any other reactor can be used to carry out the reforming of the second hydrocarbon-containing feed.

The reforming reaction can be used to produce reformed hydrocarbons via a continuous reaction process or a discontinuous reaction process. In some embodiments, the reaction process can include a reforming step, and a regeneration step, e.g., an exothermic reaction, that operate continuously while the fluidized catalyst composition is transported in-between the reforming and regeneration zone of the reactor. The endothermic reaction can include hydrocarbon reforming in the presence of the catalyst composition. Fresh hydrocarbon and regenerated fluidized catalyst particles can enter the reforming zone. After spending some time in the reforming zone, the hydrocarbon can be at least partially converted to a reforming product that can exit the reforming zone together with the spent catalyst composition. The reforming product and unreacted feed can be separated from the spent catalyst by one or more separating devices. While the reforming product and unreacted feed from the separating devices go downstream for further purification, the spent catalyst can be sent to the regeneration zone for regeneration. The exothermic regeneration reaction can be the reaction of an oxidant and, optionally a fuel, under combustion conditions to produce a regenerated catalyst and a flue gas. After regeneration, the regenerated catalyst can be separated from the flue gas by one or more separating devices and can be transported back to the reforming zone, joining more hydrocarbon feed to enter the reforming zone to initiate more reforming reaction. The reforming step can convert $CO_2$ and/or $H_2O$ and hydrocarbons, e.g., $CH_4$, to a synthesis gas that includes $H_2$ and CO. The regeneration step can combust reactants, e.g., coke disposed on the spent catalyst and/or the optional fuel and an oxidant, to generate heat that heats up the regenerated catalyst that can provide heat that can be used to drive the reforming reaction. In some embodiments, the catalyst can be heated to an average temperature in a range of from 600° C., 700° C., or 800° C. to 1,000° C., 1,300° C., or 1,600° C. during the regeneration step.

Illustrative fuels can be or can include, but are not limited to, hydrocarbons, e.g., methane, ethane, propane, butane, pentane, or hydrocarbon containing streams, e.g., natural gas, molecular hydrogen, and/or other combustible compounds. The oxidant can be or can include $O_2$. In some embodiments, the oxidant can be or can include air, $O_2$ enriched air, $O_2$ depleted air, or any other suitable $O_2$ containing stream.

The regeneration of the catalyst can correspond to removal of coke from the catalyst particles. In some embodiments, during reforming, a portion of the feed introduced into the reforming zone can form coke. This coke can potentially block access to the catalytic sites (such as metal sites) of the catalyst. During regeneration at least a portion of the coke generated during reforming can be removed as CO or $CO_2$. The regeneration of the catalyst can also correspond to re-dispersion of any agglomerated active phase of the catalyst such as the Group 8-10 element.

The second hydrocarbon-containing feed can be or can include, but is not limited to, one or more reformable $C_1$-$C_{16}$ hydrocarbons such as alkanes, alkenes, cycloalkanes, alkylaromatics, or any mixture thereof. In some embodiments, the second hydrocarbon-containing stream can be or can include methane, ethane, propane, butane, pentane, or a mixture thereof. In some embodiments, the second hydrocarbon-containing feed can be exposed to the catalyst composition under a pressure of less than 35 kPa-a. For example, the second hydrocarbon-containing feed can be exposed to the catalyst composition under a pressure in a range of from 0.7 kPa-a, 2 kPa-a, 3.5 kPa-a, 5 kPa-a, or 10 kPa-a to 15 kPa-a, 20 kPa-a, 25 kPa-a, or 30 kPa-a. In other embodiments, the second hydrocarbon-containing feed can be exposed to the catalyst composition under a pressure in a range of from 35 kPa-a to 15 MPa-a. In still other embodiments, the second hydrocarbon-containing feed can be exposed to the catalyst composition under a pressure in a range of from 0.7 kPa-a, 2 kPa-a, 5 kPa-a, 20 kPa-a, 35 kPa-a, 50 kPa-a, or 100 kPa-a to 200 kPa-a, 1 MPa-a, 3 MPa-a, 5 MPa-a, 10 MPa-a, or 15 MPa-a. In still other embodiments, the second hydrocarbon-containing feed can be exposed to the catalyst composition under a pressure of less than 2.8 MPa-a, less than 2.5 MPa-a, less than 2.2 MPa-a, or less than 2 MPa-a.

The reforming reaction of the second hydrocarbon-containing feed, e.g., $CH_4$, can occur in the presence of $H_2O$ (steam-reforming), in the presence of $CO_2$ (dry-reforming), or in the presence of both $H_2O$ and $CO_2$ (bi-reforming). Examples of stoichiometry for steam, dry, and bi-reforming of $CH_4$ are shown in equations (1)-(3).

$$\text{Dry-Reforming}: CH_4 + CO_2 = 2CO + 2H_2 \quad (1)$$

$$\text{Steam-Reforming}: CH_4 + H_2O = CO + 3H_2 \quad (2)$$

$$\text{Bi-Reforming}: 3CH_4 + 2H_2O + CO_2 = 4CO + 8H_2 \quad (3)$$

As shown in equations (1)-(3), dry reforming can produce lower ratios of $H_2$ to CO than steam reforming. Reforming reactions performed with only steam can generally produce a synthesis gas having a $H_2$: CO molar ratio of around 3, such as 2.5 to 3.5. In contrast, reforming reactions performed with only $CO_2$ can generally produce a synthesis gas having a $H_2$:CO molar ratio of roughly 1 or even lower. By using a combination of $CO_2$ and $H_2O$ during reforming, the reforming reaction can be controlled to generate a wide variety of $H_2$ to CO ratios in a resulting synthesis gas.

The reforming reaction of the second hydrocarbon-containing feed can also be performed or partially performed in the presence of $O_2$, which is often referred to as the partial oxidation reaction. Examples of stoichiometry for partial and complete oxidation are shown in equations (4) and (5).

$$\text{Partial oxidation}: CH_4 + 0.5O_2 = CO + 2H_2 \quad (4)$$

$$\text{Complete oxidation}: CH_4 + 2O_2 = CO_2 + 2H_2O \quad (5)$$

During partial oxidation of methane, a certain degree of complete oxidation of methane may be unavoidable. In such reaction, the $CO_2$ and $H_2O$ made during the complete oxidation of methane may further reform methane via one or more of reactions (1) to (3).

It should be noted that the ratio of $H_2$ to CO in a synthesis gas can also be dependent on the water gas shift equilibrium. Although the stoichiometry in Equations (1)-(4) show ratios of roughly 1 to 3, the equilibrium amounts of $H_2$ and CO in a synthesis gas can be different from the reaction stoichiometry. The equilibrium amounts can be determined based on the water gas shift equilibrium, which relates the concentrations of $H_2$, CO, $CO_2$ and $H_2O$ based on the reaction shown in equation (6).

$$H_2O + CO \leftarrow\ \rightarrow H_2 + CO_2 \quad (6)$$

In some embodiments, the catalyst composition can also serve as a water gas shift catalyst. Thus, if a reaction environment for producing $H_2$ and CO also includes $H_2O$ and/or $CO_2$, the initial stoichiometry from the reforming reaction may be altered based on the water gas shift equilibrium. However, this equilibrium is also temperature dependent, with higher temperatures favoring production of CO and $H_2O$. As a result, the ratio of $H_2$ to CO that is generated when forming synthesis gas is constrained by the water gas shift equilibrium at the temperature in the reaction zone when the synthesis gas is produced.

The ability to adjust the $H_2$:CO molar ratio of the synthesis gas provides a flexible process that can be combined with a wide variety of synthesis gas upgrading processes. Illustrative synthesis gas upgrading processes can include, but are not limited to, Fischer-Tropsch processes, methanol and/or other alcohol synthesis, e.g., one or more $C_1$-$C_4$ alcohols, fermentation processes, separation processes that can separate hydrogen to produce a $H_2$-rich product, dimethyl ether, and combinations thereof. These synthesis gas upgrading processes are well-known to persons having ordinary skill in the art. In some embodiments, the upgraded product can include, but is not limited to, methanol, syncrude, diesel, lubricants, waxes, olefins, dimethyl ether, other chemicals, or any combination thereof.

Systems suitable for carrying out the reforming of the second hydrocarbon-containing feed can include systems that are well-known in the art such as the fixed bed reactors disclosed in WO Publication No. WO2017078894; the fluidized riser reactors and/or downer reactors disclosed in U.S. Pat. Nos. 3,888,762; 7,102,050; 7,195,741; 7,122,160; and 8,653,317; and U.S. Patent Application Publication Nos. 2004/0082824; 2008/0194891; and the reverse flow reactors disclosed in U.S. Pat. Nos.: 7,740,829; 8,551,444; 8,754,276; 9,687,803; and 10,160,708; and U.S. Patent Application Publication Nos.: 2015/0065767 and 2017/0137285; and WO Publication No. WO2013169461.

Feed and Energy

The hydrocarbon-containing feeds described herein can be derived either from fossil fuel or non-fossil fuel resources. For example, propane can be a product or by-product of a process using biomass as the feed. The fuels described in this work can also be derived either from fossil fuel or non-fossil fuel resources. For example, methane or $H_2$ can be a product or by-product of a process using biomass as the feed. The fuels described in this work can also be made from renewable energy such as renewable electricity. For example, renewable electricity can be used to produce $H_2$ through water electrolysis. The energy used in the processes described herein can also be provided by renewable electricity directly through an electrically-heated furnace, instead of a fuel.

EXAMPLES

The foregoing discussion can be further described with reference to the following non-limiting examples. Catalyst Compositions 1-5 were prepared according to the following procedures.

Catalyst Composition 1—$Al(OH)_3$ (SPACERITE® S-11) and calcined Mg—Al hydrotalcite (PURALOX® MG70/170) were mixed in deionized water to form a slurry. The slurry was milled and spray dried on a BUCHI® B-290 Mini Spray Dryer to produce spray dried particles. The spray dried particles were calcined in air at 550° C. for 4 hours to produce calcined support particles contained nominally 50 wt % of the PURALOX® MG70/170 and 50 wt % of $Al_2O_3$ derived from the SPACERITE® S-11. The calcined support particles were impregnated with an aqueous solution that included tin (IV) chloride pentahydrate, chloroplatinic acid hexahydrate, and deionized water via incipient wetness impregnation. The impregnated material was allowed to equilibrate in a closed container at room temperature for 120 hours before it was dried in air at 110° C. for 6 hours and calcined in air at 800° C. for 12 hours. The final product contained nominally 0.3 wt % Pt and 1.5 wt % Sn based on the weight of the support particles.

Catalyst Composition 2—Colloidal $SiO_2$ (LUDOX® AS-40) (50 g) and calcined Mg—Al hydrotalcite (PURALOX® MG70/170) (22 g) were mixed in deionized water (236 ml) to form a slurry. The slurry was milled and spray dried on a BUCHI® B-290 Mini Spray Dryer to produce spray dried particles. The spray dried particles were calcined in air at 550° C. for 4 hours to produce calcined support particles that contained nominally 50 wt % of PURALOX® MG70/170 and 50 wt % SiO2 derived from LUDOX® AS-40. The calcined support particles were impregnated with an aqueous solution that included tin (IV) chloride pentahydrate, chloroplatinic acid hexahydrate, and deionized water via incipient wetness impregnation. The impregnated material was allowed to equilibrate in a closed container at room temperature for 120 hours before it was dried in air at 110° C. for 6 hours and calcined in air at 800° C. for 12 hours in air. The final product contained nominally 0.3 wt % Pt and 1.5 wt % Sn based on the weight of the support particles.

Catalyst Composition 3—A 2/1 (wt/wt) Mg/Si mixed metal oxide was made in an agate ball mill cup by adding MgO (8.04 g) (Acros), $SiO_2$ (4.03 g) (Sigma-Aldrich), deionized water (10 g) and, 3 agate balls. The material was ball milled for 70 h at 500 rpm. The lid was sealed to reduce water evaporation during ball milling. After ball milling, a thick paste was obtained. The paste was calcined at 200° C. for 4 hours and then at 800° C. for 4 hours, all in air, to obtain the support. In a glass vial, chloroplatinic acid hexahydrate (0.0296 g) (Sigma Aldrich) and tin (IV) chloride pentahydrate (0.0365 g) (Sigma Aldrich) were dissolved in deionized water (1.4319 g) to obtain a dark orange clear solution (Pt/Sn solution). The 2/1 Mg/Si mixed metal oxide support (2.8178 g) was added to a 50 mL plastic bottle, followed by dropwise addition of the Pt/Sn solution (1.2704 g). The material was mixed using a small lab shaker until a homogeneous light orange colored powder was obtained. The metal-impregnated catalyst was dried at 120° C. for 4 hours and then calcined at 800° C. for 12 hours, all in air. The final product contained nominally 0.33 wt % Pt and 0.33 wt % Sn based on the weight of the support. Without wishing to be bound by theory, it is believed that some of the Mg and Si was mixed on the atomic scale, i.e., a portion of the Mg and Si was in the form of a mixed Mg/Si metal oxide and some of the Mg and some of the Si was mixed on the nm scale.

Catalyst Composition 4—A slurry that included 40 wt % of aluminum chlorohydrol solution (ACH) (42 g), calcined Mg—Al hydrotalcite (PURALOX® MG70/170) (97 g), tin(II) chloride dehydrate (3 g), and 3.1 wt % tetraammineplatinum(II) nitrate solution (10 g) in deionized water (592 ml) was prepared. The slurry was milled and spray dried on a BUCHI® B-290 Mini Spray Dryer to produce spray dried particles. The spray dried particles were calcined in air at 800° C. for 12 hours to produce the catalyst composition that contained nominally 0.3 wt % Pt and 1.5 wt % Sn on 90:10 MG70/170: $Al_2O_3$.

Catalyst Composition 5—Catalyst Composition 4 was impregnated with an aqueous solution of tetramethylammonium silicate. The impregnated material was allowed to equilibrate in a closed container at room temperature for 24 hour before it was dried in air at 110° C. for 6 hours and calcined in air at 800° C. for 12 hours. The final product contained nominally 0.3 wt % Pt, 0.45 wt % Si, and 1.5 wt % Sn.

Examples Using the Catalysts Compositions 1-5 Described Above

Fixed bed experiments that used the catalysts were conducted at approximately 100 kPa-absolute that used the Catalyst Compositions 1-5. A gas chromatograph (GC) was used to measure the composition of the reactor effluents. The concentrations of each component in the reactor effluents were then used to calculate the $C_3H_6$ yield and selectivity. The $C_3H_6$ yield and selectivity, as reported in these examples, were calculated on the carbon mole basis.

In each example, 0.3 g of catalyst was mixed with an appropriate amount of quartz diluent and loaded into a quartz reactor. The amount of diluent was determined so that the catalyst bed (catalyst+diluent) overlapped with the isothermal zone of the quartz reactor and the catalyst bed was largely isothermal during operation. The dead volume of the reactor was filled with quartz chips/rods.

The process steps that used Catalyst Compositions 1 and 2 were as follows: 1. The system was flushed with an inert gas. 2. Dry air at a flow rate of 83.9 sccm was passed through a by-pass of the reaction zone, while an inert gas was passed through the reaction zone. The reaction zone was heated to a regeneration temperature of 800° C. 3. Dry air at a flow rate of 83.9 sccm was then passed through the reaction zone for 10 min to regenerate the catalyst. 4. The system was flushed with an inert gas. 5. A $H_2$ containing gas with 10 vol % $H_2$ and 90 vol % Ar at a flow rate of 46.6 sccm was passed through the by-pass of the reaction zone for a certain period of time, while an inert gas was passed through the reaction zone. This was then followed by flowing the $H_2$ containing gas through the reaction zone at 800° C. for 3 s. 6. The system was flushed with an inert gas. During this process, the temperature of the reaction zone was changed from 800° C. to a reaction temperature of 670° C. 7. A hydrocarbon-containing (HCgas) feed that included 81 vol % of $C_3H_8$, 9 vol % of inert gas (Ar or Kr) and 10 vol % of steam at a flow rate of 17.6 sccm was passed through the by-pass of the reaction zone for a certain period of time, while an inert gas was passed through the reaction zone. The hydrocarbon-containing feed was then passed through the reaction zone at 670° C. for 10 min. GC sampling of the reaction effluent was started as soon as the feed was switched from the by-pass of the reaction zone to the reaction zone. The above process steps were repeated in cycles.

Figure 2:
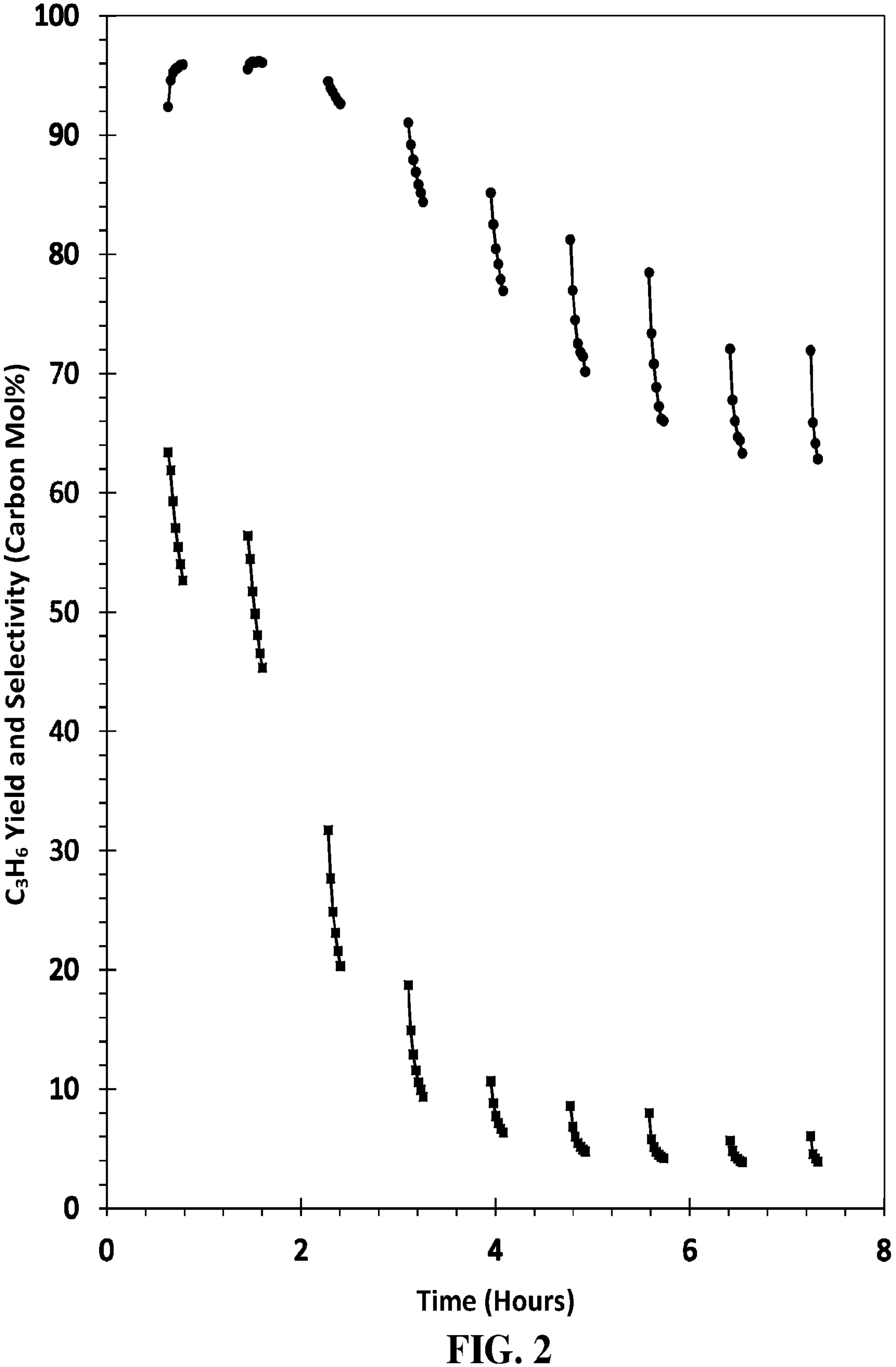
FIG. 2 shows the $CH_6$ yield and selectivity of a catalyst composition (Catalyst 2) that included Al and Si in the support deactivated rapidly as the number of cycles increased.
Figure 3:
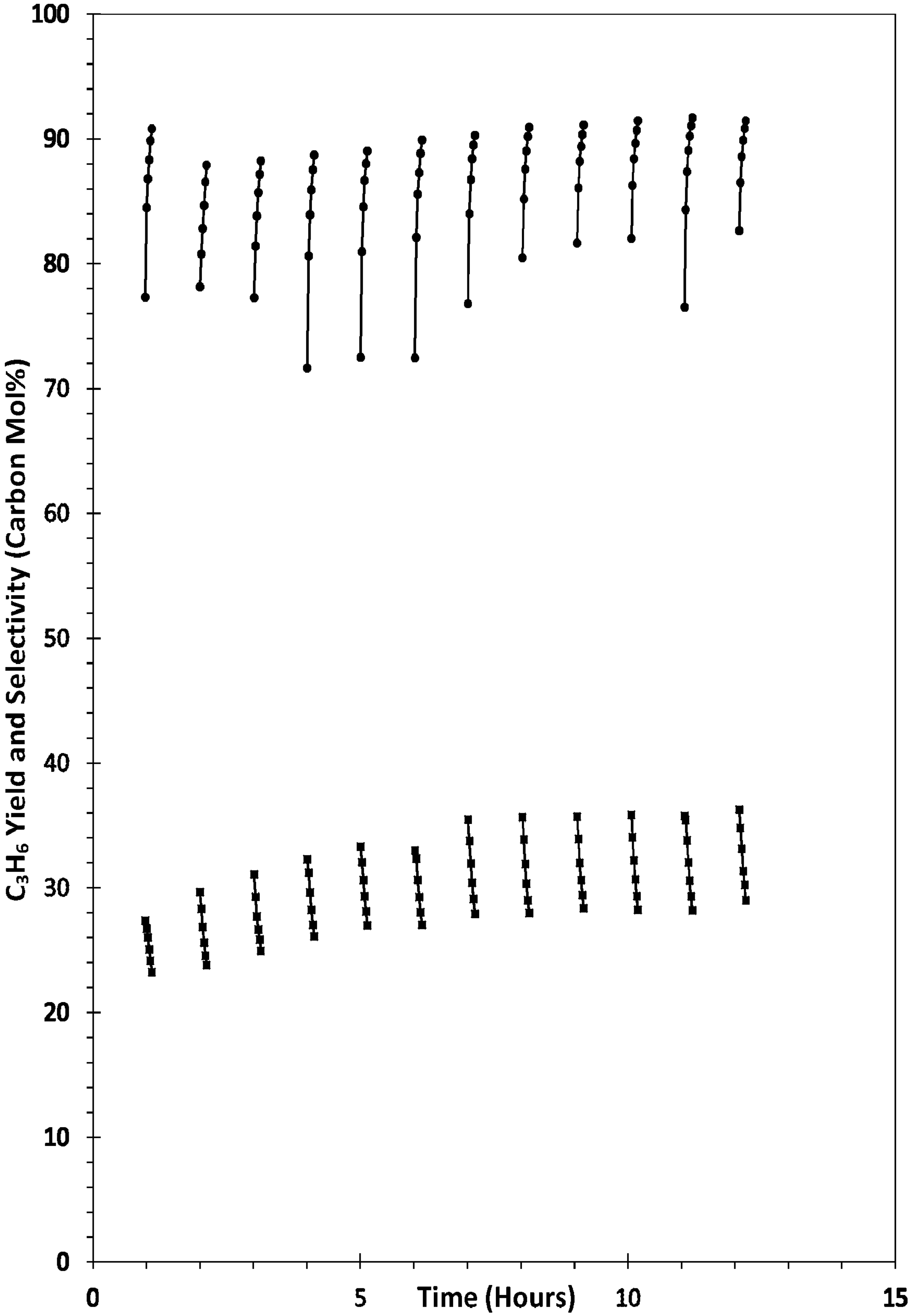
FIG. 3 shows the $C_3H_6$ yield and selectivity of a catalyst composition (Catalyst 3) that included Si in the support and was free of Al maintained its performance over a number of cycles.

FIGS. 1-3 in this application show $C_3H_6$ yield and $C_3H_6$ selectivity of various catalyst compositions as a function of time. Thus, in FIGS. 1, 2, and 3, the horizontal axis is time in hours, and the vertical axis is $C_3H_6$ yield (lower set of data, represented by solid squares) and $C_3H_6$ selectivity (upper set of data, represented by solid circles), in carbon mol %

FIGS. 1 and 2 show the $C_3H_6$ yield and selectivity of the catalyst compositions 1 and 2, respectively. Catalyst Composition 2 that included 50 wt % of $SiO_2$ deactivated rapidly as the number or cycle increases but Catalyst Composition 1 that did not include any $SiO_2$ did not.

The process steps that used Catalyst Composition 3 were as follows: 1. The system was flushed with an inert gas. 2. Dry air at a flow rate of 83.9 sccm was passed through a by-pass of the reaction zone, while an inert was passed through the reaction zone. The reaction zone was heated to a regeneration temperature of 800° C. 3. Dry air at a flow rate of 83.9 sccm was then passed through the reaction zone for 15 min to regenerate the catalyst. 4. The system was flushed with an inert gas while being cooled down to 620° C. 5. A $H_2$ containing gas with 10 vol % $H_2$ and 90 vol % Ar at a flow rate of 46.6 sccm was passed through the by-pass of the reaction zone for a certain period of time, while an inert gas was passed through the reaction zone. This is then followed by flowing the $H_2$ containing gas through the reaction zone at 620° C. for 60 s. 6. The system was flushed with an inert gas. 7. A hydrocarbon-containing (HCgas) feed that included 81 vol % of $C_3H_8$, 9 vol % of inert gas (Ar or Kr) and 10 vol % of steam at a flow rate of 17.6 sccm was passed through the by-pass of the reaction zone for a certain period of time, while an inert gas was passed through the reaction zone. The hydrocarbon-containing feed was then passed through the reaction zone at 620° C. for 10 min. GC sampling of the reaction effluent was started as soon as the feed was switched from the by-pass of the reaction zone to the reaction zone. The above process steps were repeated in cycles.

FIG. 3 shows the $C_3H_6$ yield and selectivity of Catalyst Composition 3 (x-axis, time in hour; y-axis Carbon Mole %; upper set of data points is the $C_3H_6$ selectivity; lower set of data points is the $CH_6$ yield). FIGS. 1-3 show that Si causes rapid deactivation of the catalyst only when Al is present.

The process steps that used Catalyst Compositions 4 and 5 were as follows: 1. The system was flushed with an inert gas. 2. A 90% air, 10% $H_2O$ mixture at a flow rate of 93.2 sccm was passed through a by-pass of the reaction zone, while an inert was passed through the reaction zone. The reaction zone was heated to a regeneration temperature of 800° C. 3. The 90% air, 10% $H_2O$ mixture at a flow rate of 93.2 sccm was then passed through the reaction zone for 1 min, which is followed by flowing dry air at a flow rate of 83.9 sccm through the reaction zone for an additional 10 min to regenerate the catalyst. 4. The system was flushed with an inert gas. 5. A $H_2$ containing gas with 10 vol % $H_2$ and 90 vol % Ar at a flow rate of 46.6 sccm was passed through the by-pass of the reaction zone for a certain period of time, while an inert gas was passed through the reaction zone. This is then followed by flowing the $H_2$ containing gas through the reaction zone at 800° C. for 3 s. 6. The system was flushed with an inert gas. During this process, the temperature of the reaction zone was changed from 800° C. to a reaction temperature of 655° C. 7. A hydrocarbon-containing (HCgas) feed that included 81 vol % of $C_3H_8$, 9 vol % of inert gas (Ar or Kr) and 10 vol % of steam at a flow rate of 17.6 sccm was passed through the by-pass of the reaction zone for a certain period of time, while an inert gas was passed through the reaction zone. The hydrocarbon-containing feed was then passed through the reaction zone at 655° C. for 10 min. GC sampling of the reaction effluent started as soon as the feed was switched from the by-pass of the reaction zone to the reaction zone. The above process steps were repeated in cycles.

Figure 4:
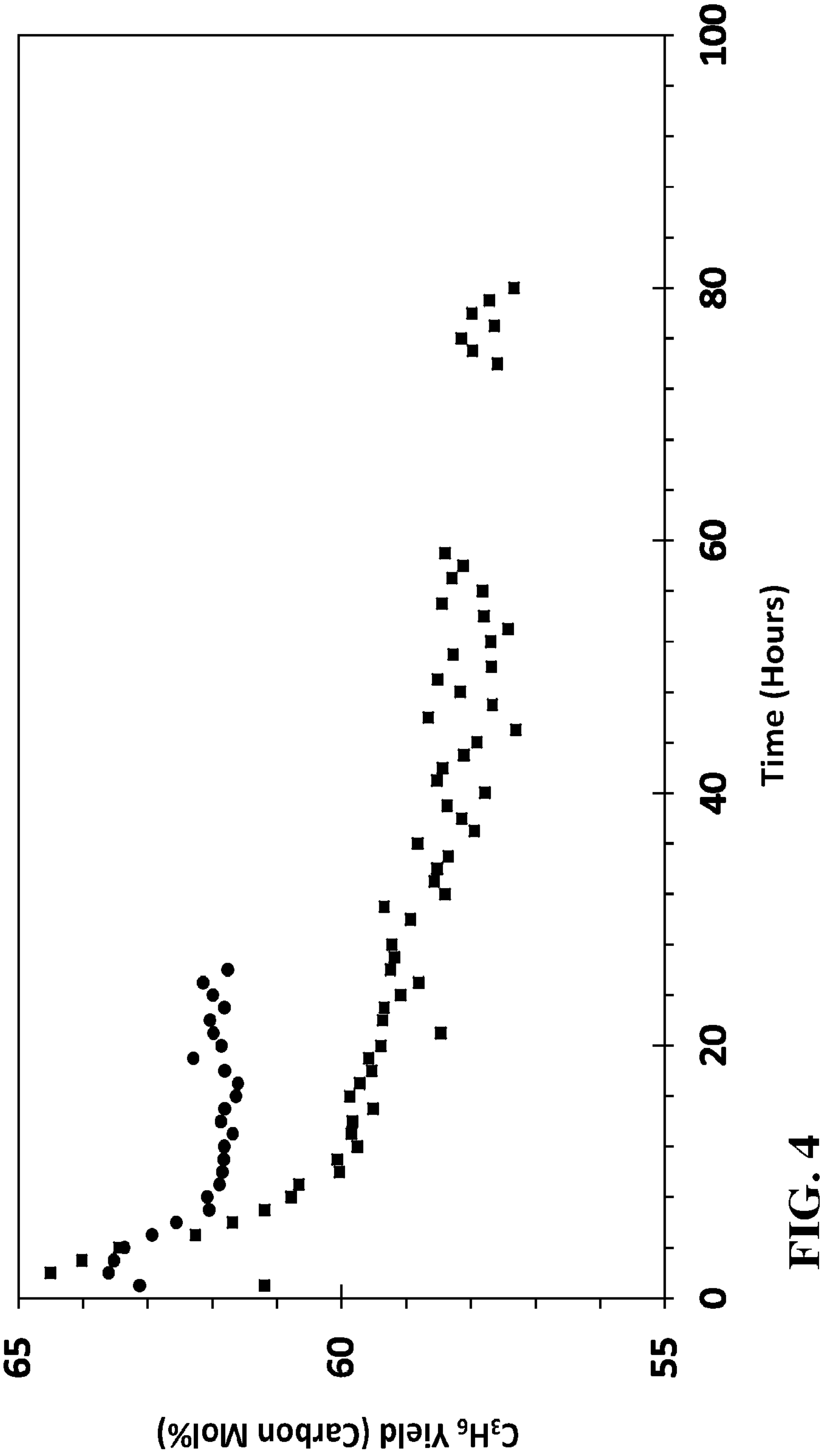
FIG. 4 shows the average $C_3H_6$ yield plotted against the number of cycles for a catalyst composition (Catalyst 4) that included Al in the support and was free of Si and a catalyst composition (Catalyst 5) that included Al and 0.45 wt % of Si, where Catalyst 5 deactivated as the number of cycles increased while Catalyst 4 did not.

FIG. 4 shows the average $C_3H_6$ yield in each cycle plotted against the number or cycles for Catalyst Compositions 4 and 5, respectively (the solid circle data points are the average $C_3H_6$ yield for Catalyst Composition 4; the solid square data points are the average $C_3H_6$ yield for Catalyst Composition 5). Catalyst composition 5 that included 0.45 wt % Si deactivated as the number of cycles increased while catalyst composition 4 that did not include any Si did not.

Listing of Embodiments

This disclosure may further include the following non-limiting embodiments.

A1. A process for upgrading a hydrocarbon, comprising: (I) contacting a hydrocarbon-containing feed with a catalyst composition comprising a Group 8-10 element disposed on a support to effect reforming of at least a portion of the hydrocarbon-containing feed to produce a coked catalyst composition and a synthesis gas comprising $H_2$ and CO, wherein: the hydrocarbon-containing feed comprises one or more $C_1$-$C_{16}$ hydrocarbons and $H_2O$, $CO_2$, or a mixture of $H_2O$ and $CO_2$, the hydrocarbon-containing feed and catalyst composition are contacted at a temperature of 400° C. or more, the support comprises Al and at least 0.5 wt % of a Group 2 element, the catalyst composition comprises 0.001 wt % to 6 wt % of the Group 8-10 element, the catalyst composition is free of Si or contains <0.5 wt %, <0.45 wt %, <0.4 wt %, <0.35 wt %, <0.3 wt %, <0.25wt %, <0.2 wt %, <0.15 wt %, <0.1 wt %, <0.05 wt %, or <0.01 wt % of Si, where all weight percent values are based on the weight of the support.

A2. The process of A1, further comprising (II) contacting at least a portion of the coked catalyst composition with an oxidant to effect combustion of at least a portion of the coke to produce a regenerated catalyst composition lean in coke and a combustion gas.

A3. The process of A2, further comprising (III) contacting a fuel with the oxidant and the catalyst composition to effect combustion of at least a portion of the fuel.

A4. The process of A2 or A3, further comprising (IV) contacting an additional quantity of the hydrocarbon-containing feed with at least a portion of the regenerated catalyst composition to produce a re-coked catalyst composition and additional effluent.

A5. The process of any of A1 to A4, wherein the hydrocarbon-containing feed is contacted with the catalyst composition in a fluidized bed reactor.

A6. The process of any of A1 to A4, wherein the hydrocarbon-containing feed is contacted with the catalyst composition in a fixed bed reactor.

A7. The process of any of A1 to A4, wherein the hydrocarbon-containing feed is contacted with the catalyst composition in a reverse flow reactor.

A8. The process of any of A1 to A7, wherein the catalyst composition comprises 0.001 wt %, 0.001 wt %, 0.01 wt %, 0.1 wt %, 0.15 wt %, or 0.2 wt % to 0.4 wt %, 0.6 wt %, 0.8 wt %, 1 wt %, 2 wt %, 3 wt %, 4 wt %, 5 wt %, or 6 wt % of the Group 8-10 element based on the weight of the support.

A9. The process of any of A1 to A8, wherein the Group 8-10 element comprises Pt.

A10. The process of any of A1 to A9, wherein the catalyst composition further comprises a promoter disposed on the support in an amount of up to 10 wt % based on the weight of the support, wherein the promoter comprises Sn, Cu, Au, Ag, Ga, Zn, Ge, In, Re, Ag, a combination thereof, or a mixture thereof.

A11. The process of any of A1 to A10, wherein the catalyst composition further comprises an alkali metal element comprising Li, Na, K, Rb, Cs, a combination thereof, or a mixture thereof disposed on the support in an amount of up to 5 wt % based on the weight of the support.

A12. The process of any of A1 to A11, wherein the catalyst composition is in the form of particles having a size and particle density that is consistent with a Geldart A or Geldart B definition of a fluidizable solid.

A13. The process of any of A1 to A12, wherein a weight ratio of the Group 2 element to the A1 in the support is in a range from 0.001, 0.01, 0.1, or 1 to 6, 12.5, 100, or 1,000.

A14. The process of any of A1 to A13, wherein: the Group 2 element comprises Mg, and at least a portion of the Mg is in the form of MgO or a mixed metal oxide comprising Mg.

A15. The process of any of A1 to A14, wherein: the Group 2 element comprises Mg, and at least a portion of the Mg and at least a portion of the A1 is in the form of a mixed Mg/Al metal oxide.

A16. The process of any of A1 to A15, wherein: the Group 2 element comprises Mg, at least a portion of the Mg and at least a portion of the A1 is in the form of a mixed Mg/Al metal oxide, and a weight ratio of the Mg to the Al in the mixed Mg/Al metal oxide is in a range from 0.001, 0.01, 0.1, or 1 to 6, 12.5, 100, or 1,000.

A17. The process of any of A1 to A16, wherein: at least a portion of the Group 2 element is in the form of an oxide of the Group 2 element, at least a portion of the A1 is in the form $Al_2O_3$, and the oxide of the Group 2 element and the $Al_2O_3$ are mixed on a nm scale.

A18. The process of any of A1 to A17, wherein: the Group 2 element comprises Mg, at least a portion of the Mg is in the form of MgO, at least a portion of the Al is in the form $Al_2O_3$, and the oxide of the MgO and the $Al_2O_3$ are mixed on a nm scale.

A19. The process of any of A1 to A18, further comprising at least one of: reacting at least a portion of the synthesis gas under effective Fischer-Tropsch conditions in the presence of a Fischer-Tropsch catalyst to produce an upgraded product, wherein the Fischer-Tropsch catalyst comprises a shifting Fischer-Tropsch catalyst or a non-shifting Fischer-Tropsch catalyst; subjecting at least a portion of the synthesis gas to a fermentation process to produce an alcohol, an organic acid, or a mixture thereof; contacting at least a portion of the synthesis gas with a catalyst to produce at least one $C_1$-$C_4$ alcohol; and separating $H_2$ from the synthesis gas to produce a $H_2$-rich product.

B1. A process for making a catalyst composition, comprising: (I) preparing a slurry or gel comprising Al and/or a compound thereof, a Group 2 element and/or a compound thereof, and a liquid medium; and (II) spray drying the slurry or the gel to produce spray dried support particles comprising at least Al and the Group 2 element, wherein, at least one of (i) and (ii) is met: (i) the Group 8-10 element is present in the slurry or the gel in the form of a Group 8-10-containing compound and the catalyst composition comprises catalyst particles comprising the spray dried support particles having the Group 8-10 element disposed thereon, and (ii) the Group 8-10 element is deposited on the spray dried support particles by contacting the spray dried particles with a Group 8-10 element-containing compound to produce Group8-10 element-containing spray dried support particles and the catalyst composition comprises catalyst particles comprising the spray dried support particles having the Group 8-10 element disposed thereon, wherein: the catalyst particles comprise 0.001 wt % to 6 wt % of the Group 8-10element disposed on the support, the support includes Al and at least 0.5 wt % of the Group 2 element and is free of Si or contains <0.5 wt %, <0.45 wt %, <0.4 wt %, <0.35 wt %, <0.3 wt %, <0.25 wt %, <0.2 wt %, <0.15 wt %, <0.1 wt %, <0.05 wt %, or <0.01 wt % of Si, based on the weight of the spray dried support particles.

B2. The process of B1, further comprising, at least one of (iii) and (iv): (iii) a compound comprising a promoter element is present in the slurry or the gel and the catalyst composition comprises catalyst particles comprising the spray dried support particles having the promoter element disposed thereon, and (iv) a compound comprising a promoter element is deposited on the spray dried support particles to produce promoter-containing spray dried support particles and the catalyst composition comprises catalyst particles comprising the spray dried support particles having the promoter element disposed thereon, wherein: the promoter element comprises Sn, Cu, Au, Ag, Ga, Zn, Ge, In, Re, Ag, a combination thereof, or a mixture thereof.

B3. The process of B2, wherein the spray dried support particles comprise up to 10 wt % of the promoter element, based on the weight of the spray dried support particles.

B4. The process of any of B1 to B3, wherein the Group 8-10 element-containing compound is present in the slurry or the gel.

B5. The process of any one of B1 to B4, wherein the Group 8-10 element-containing compound is deposited on the spray dried support particles.

B6. The process of any of B2 to B5, wherein the compound comprising the promoter element is present in the slurry or the gel.

B7. The process of any of B2 to B6, wherein the compound comprising the promoter element is deposited on the spray dried support particles.

B8. The process of any of B1 to B7, wherein: the Group 2 element comprises Mg, and at least a portion of the Group 2 element and at least a portion of the Al in the spray dried support particles is in the form of a mixed Mg/Al metal oxide.

B9. The process of any of B1 to B8, further comprising: (III) calcining the spray dried support particles under an oxidative atmosphere to produce calcined support particles, wherein the catalyst composition comprises catalyst particles comprising the calcined support particles comprising the Al and the Group 2 element and having the Group 8-10 element and, optionally, the promoter element disposed thereon.

B10. The process of B9, further comprising: (IV) hydrating the calcined support particles after step (III) to produce hydrated support particles; and (V) calcining the hydrated support particles to produce the catalyst composition comprising re-calcined support particles, wherein the catalyst particles produced via steps (IV) and (V) have an attrition loss after one hour that is less than an attrition loss after one hour of the calcined particles produced in step (III), as measured according to ASTM D5757-11(2017).

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A catalyst composition comprising 0.001 wt % to 6 wt % of a Group 8-10 element disposed on a support, wherein:
the support comprises Al and at least 0.5 wt % of a Group 2 element,
the catalyst composition is free of Si or contains <0.5 wt % of Si, and
all weight percent values are based on the weight of the support.

2. The catalyst composition of claim 1, wherein a weight ratio of the Group 2 element to the Al in the support is in a range from 0.001 to 1,000.

3. The catalyst composition of claim 1, wherein:
the Group 2 element comprises Mg, and
at least a portion of the Mg is in the form of MgO or a mixed metal oxide comprising Mg.

4. The catalyst composition of claim 1, wherein:
the Group 2 element comprises Mg, and
at least a portion of the Mg and at least a portion of the Al is in the form of a mixed Mg/Al metal oxide.

5. The catalyst composition of claim 1, wherein:
the Group 2 element comprises Mg,
at least a portion of the Mg and at least a portion of the Al is in the form of a mixed Mg/Al metal oxide, and
a weight ratio of the Mg to the Al in the mixed Mg/Al metal oxide is in a range from 0.001 to 1,000.

6. The catalyst composition of claim 1, wherein:
at least a portion of the Group 2 element is in the form of an oxide of the Group 2 element,
at least a portion of the Al is in the form $Al_2O_3$, and
the oxide of the Group 2 element and the $Al_2O_3$ are mixed on a nm scale.

7. The catalyst composition of claim 1, wherein:
the Group 2 element comprises Mg,
at least a portion of the Mg is in the form of MgO,
at least a portion of the Al is in the form $Al_2O_3$, and
the oxide of the MgO and the $Al_2O_3$ are mixed on a nm scale.

8. The catalyst composition of claim 1, wherein the catalyst comprises 0.01 wt % to 0.15 wt % of the Group 8-10 element or a compound thereof disposed on the support, based on the weight of the support.

9. The catalyst composition of claim 1, wherein the Group 8-10 element comprises Pt.

10. The catalyst composition of claim 1, further comprising a promoter disposed on the support in an amount of up to 10 wt % based on the weight of the support, wherein the promoter comprises Sn, Cu, Au, Ag, Ga, a combination thereof, or a mixture thereof.

11. The catalyst composition of claim 1, further comprising an alkali metal element comprising Li, Na, K, Rb, Cs, or a combination thereof, or a mixture thereof disposed on the support in an amount of up to 5 wt % based on the weight of the support.

12. The catalyst composition of claim 1, wherein the catalyst composition is in the form of particles having a size and a particle density that is consistent with a Geldart A or Geldart B definition of a fluidizable solid.

13. A process for making a catalyst composition, comprising:
(I) preparing a slurry or a gel comprising Al or a compound thereof, a Group 2 element or a compound thereof, and a liquid medium;
(II) spray drying the slurry or the gel to produce spray dried particles comprising the Al or the compound thereof and the Group 2 element or the compound thereof; and
(III) calcining the spray dried particles under an oxidative atmosphere to produce calcined support particles comprising the Al or the compound thereof and the Group 2 element or the compound thereof,
wherein, at least one of (i), (ii), and (iii) is met:
(i) a Group 8-10 element is present in the slurry or the gel in the form of a Group 8-10 element-containing compound and the catalyst composition comprises catalyst particles comprising the calcined support particles having the Group 8-10 element disposed thereon,
(ii) a Group 8-10 element is deposited on the spray dried particles by contacting the spray dried particles with a Group 8-10 element-containing compound to produce Group 8-10 element-containing spray dried particles and the catalyst composition comprises catalyst particles comprising the calcined support particles having the Group 8-10 element disposed thereon, and
(iii) a Group 8-10 element is deposited on the calcined support particles by contacting the calcined support particles with a Group 8-10 element-containing compound to produce Group 8-10 element-containing calcined support particles and the process further comprises (IV) calcining the Group 8-10 element-containing calcined support particles to produce re-calcined support particles having the Group 8-10 element disposed thereon, wherein the catalyst composition comprises the re-calcined support particles,
wherein:
the catalyst particles comprise the Group 8-10 element in an amount of 0.001 wt % to 6 wt %, the catalyst particles comprise at least 0.5 wt % of the Group 2 element, the catalyst composition is free of Si or contains <0.5 wt % of Si, and all weight percent values are based on the weight of the calcined support particles or the re-calcined support particles.

14. The process of claim 13, wherein at least one of (iv), (v), and (vi) is met:

(iv) a compound comprising a promoter element is present in the slurry or the gel and the catalyst composition comprises catalyst particles comprising the calcined support particles having the promoter element disposed thereon, (v) a compound comprising a promoter element is deposited on the spray dried particles to produce promoter-containing spray dried particles and the catalyst composition comprises catalyst particles comprising the calcined support particles having the promoter element disposed thereon, and (vi) a compound comprising a promoter element is deposited on the calcined support particles to produce promoter-containing calcined support particles and the process further comprises (V) calcining the promoter-containing calcined support particles to produce re-calcined support particles having the promoter element disposed thereon, wherein the catalyst composition comprises the re-calcined support particles, wherein:

the promoter element comprises Sn, Cu, Au, Ag, Ga, a combination thereof, or a mixture thereof, and the catalyst particles comprise the promoter element in an amount of up to 10 wt % based on the weight of the calcined support particles or the re-calcined support particles.

15. The process of claim 13, wherein the spray dried particles are calcined at a temperature in a range of from 550° C. to 900° C. for a time period of ≤45 minutes.

16. The process of claim 13, wherein the spray dried particles are calcined at a temperature of <550° C. for a time period of ≤45 minutes.

17. The process of claim 13, wherein the Group 8-10 element-containing compound is present in the slurry or the gel.

18. The process of claim 13, wherein the Group 8-10 element-containing compound is deposited on the spray dried particles.

19. The process of claim 14, wherein the compound comprising the promoter elements is present in the slurry or the gel.

20. The process of claim 14, wherein the compound comprising the promoter is deposited on the spray dried particles.

21. The process of claim 13, further comprising:

(IV) hydrating the calcined support particles after step (III) to produce hydrated support particles; and (V) calcining the hydrated support particles to produce the catalyst comprising re-calcined support particles, wherein the catalyst particles produced via steps (IV) and (V) have an attrition loss after one hour that is less than an attrition loss after one hour of the calcined particles produced in step (III), as measured according to ASTM D5757-11(2017).

22. The process of claim 13, wherein:

the Group 2 element comprises Mg, and at least a portion of the Group 2 element and at least a portion of the Al is in the form of a mixed Mg/Al metal oxide.

23. A process for upgrading a hydrocarbon, comprising:

(I) contacting a hydrocarbon-containing feed with a catalyst composition comprising a Group 8-10 element disposed on a support to effect one or more of dehydrogenation, dehydroaromatization, and dehydrocyclization of at least a portion of the hydrocarbon-containing feed to produce a coked catalyst composition and an effluent comprising one or more upgraded hydrocarbons and molecular hydrogen, wherein:

the hydrocarbon-containing feed comprises one or more of $C_2$-$C_{16}$ linear or branched alkanes, or one or more of $C_4$-$C_{16}$ cyclic alkanes, or one or more $C_8$-$C_{16}$ alkyl aromatics, or a mixture thereof, the hydrocarbon-containing feed and catalyst composition are contacted at a temperature in a range of from 300° C. to 900° C., for a time period of ≤3 hours, under a hydrocarbon partial pressure of at least 20 kPa-absolute, wherein the hydrocarbon partial pressure is the total partial pressure of any $C_2$-$C_{16}$ alkanes and any $C_8$-$C_{16}$ alkyl aromatics in the hydrocarbon-containing feed, the support comprises Al and at least 0.5 wt % of a Group 2 element, the catalyst composition comprises the Group 8-10 element in an amount of 0.001 wt % to 6 wt %, the catalyst composition is free of Si or contains <0.5 wt % of Si, all weight percent values are based on the weight of the support, and the one or more upgraded hydrocarbons comprise at least one of a dehydrogenated hydrocarbon, a dehydroaromatized hydrocarbon, and a dehydrocyclized hydrocarbon.

24. The process of claim 23, further comprising:

(II) contacting at least a portion of the coked catalyst with an oxidant to effect combustion of at least a portion of the coke to produce a regenerated catalyst lean in coke and a combustion gas; and (III) contacting an additional quantity of the hydrocarbon-containing feed with at least a portion of the regenerated catalyst to produce a re-coked catalyst and additional effluent, wherein a cycle time from contacting the hydrocarbon-containing feed with the catalyst particles in step (I) to contacting the additional quantity of the hydrocarbon-containing feed with the regenerated catalyst in step (III) is ≤5 hours.

25. The process of claim 23, wherein:

the Group 2 element comprises Mg, and at least a portion of the Group 2 element and at least a portion of the Al is in the form of a mixed Mg/Al metal oxide.

* * * * *